United States Patent
Hayashida et al.

(10) Patent No.: US 6,565,629 B1
(45) Date of Patent: May 20, 2003

(54) VAPOR-LIQUID CONTACTOR, CRYOGENIC AIR SEPARATION UNIT AND METHOD OF GAS SEPARATION

(75) Inventors: Shigeru Hayashida, Tokyo (JP); Hitoshi Kihara, Tokyo (JP); Hiroshi Kawakami, Tokyo (JP)

(73) Assignee: Nippon Sanso Corporation, Tokyo (JP)

( * ) Notice: Subject to any disclaimer, the term of this patent is extended or adjusted under 35 U.S.C. 154(b) by 0 days.

(21) Appl. No.: 09/470,578

(22) Filed: Dec. 22, 1999

(30) Foreign Application Priority Data

Dec. 28, 1998 (JP) .......................................... 10-372181

(51) Int. Cl.[7] .............................................. B01D 47/14
(52) U.S. Cl. ........................ 95/211; 96/299; 261/112.2
(58) Field of Search .................. 95/211, 210; 96/290, 96/299, 326, FOR 123, FOR 131; 261/DIG. 72, 112.1, 112.2, 113

(56) References Cited

U.S. PATENT DOCUMENTS

| | | | |
|---|---|---|---|
| 3,785,620 A | * | 1/1974 | Huber |
| 3,952,077 A | * | 4/1976 | Wigley |
| 4,597,916 A | * | 7/1986 | Chen |
| 4,604,247 A | * | 8/1986 | Chen et al. |
| 4,915,878 A | * | 4/1990 | Gyorgy et al. |
| 4,950,430 A | * | 8/1990 | Chen et al. |
| 5,204,027 A | * | 4/1993 | Armstrong et al. |
| 5,237,823 A | | 8/1993 | Cheung et al. |
| 5,486,318 A | * | 1/1996 | McKeigue et al. |
| 5,501,079 A | | 3/1996 | Kreis et al. |
| 5,632,934 A | * | 5/1997 | Billingham et al. |
| 5,700,403 A | * | 12/1997 | Billingham et al. |
| 5,725,810 A | * | 3/1998 | Brunner et al. |
| 5,901,575 A | | 5/1999 | Sunder |
| 5,984,282 A | | 11/1999 | Armstrong et al. |

FOREIGN PATENT DOCUMENTS

| | | |
|---|---|---|
| GB | 1 569 828 | 1/1977 |
| JP | 54-16761 | 2/1979 |
| JP | 57-36009 | 8/1982 |
| JP | 58-11001 | 1/1983 |
| JP | 7-113514 | 5/1995 |

* cited by examiner

Primary Examiner—Duane S. Smith
(74) Attorney, Agent, or Firm—Merchant & Gould P.C.

(57) ABSTRACT

In an vapor-liquid contactor $4a$ for flowing down a liquid along the surface of a packing and contacting said liquid with the vapor while ascending the vapor, the improvement being characterized in that said packing is a non-promoting-fluid-dispersion type structured packing $A_1$, $A_2$ in which various types of thin sheets or tubes for determining the flow direction of the above liquid or vapor is laminated and arranged in the perpendicular direction, and said contactor includes at least one fluid distribution unit $E_1$, $E_2$ formed of a rough distribution part $C_1$, $C_2$ to distribute the liquid roughly and a minute distribution part $B_1$, $B_2$ to distribute the liquid minutely and equally.

2 Claims, 22 Drawing Sheets

VAPOR-LIQUID CONTACTOR, CRYOGENIC AIR SEPARATION UNIT AND METHOD OF GAS SEPARATION

TECHNICAL FIELD

The present invention relates to a vapor-liquid contactor adapted to perform a vapor-liquid contact to thereafter separate gas mixture under a cryogenic distillation, and more particularly to a vapor-liquid contactor for use in the cryogenic air separation unit for carrying out a cryogenic separation of nitrogen, oxygen, argon from air, to a cryogenic air separation unit using the vapor-liquid contactor, and to a method of gas separation using the vapor-liquid contactor.

TECHNICAL BACKGROUND

A distillation column used in a cryogenic air separation unit, etc. includes a packed column, a sieve tray column and the like. Among them, a packed column has an advantage of a low pressure loss (pressure drop) and a low operation cost with comparison to a sieve tray column. Further, the packed column has several advantages in that it can increase a relative volatility between each components of air by setting a low operation pressure according to its low pressure loss; the length of the column can be extended; and thus a high purity of product, especially high purity of argon, can be prepared.

In general, the packed column includes a vapor-liquid contact part formed of a packing, a liquid distributor and the like inside of the column. Such type of structured material is referred to as a vapor-liquid contactor in the present specification.

A structured packing of a self-promoting-fluid-dispersion type is widely used as packing used in the above vapor-liquid contactor.

The self-promoting-fluid-dispersion type structured packing may be provided by processing a metal sheet made of aluminum and the like to an appropriate flexural finishing, laminating and arranging the sheets in a condition of at least one portion thereof to be inclined from the perpendicular axis to disperse the liquid while flowing in a surface of the packing at an angle to the perpendicular axis. Further, it may promote a dispersion of the liquid by providing corrugations and/or unevennesses and/or holes on the surface of the metal sheet. Structured packing is said also regular packing.

Specific examples of the self-promoting-fluid-dispersion type structured packing may include self-promoting-fluid-dispersion type structured packings 71, 81 as shown in FIGS. 6 and 7. FIG. 6 is what is disclosed in Japanese Patent Publication No. (Sho) 57-36009 and FIG. 7 is what is disclosed in Japanese Laid-open Patent No. (Sho) 54-16761. In addition, the self-promoting-fluid-dispersion type structured packing is disclosed in Japanese Patent Publication No. (Hei) 7-113514.

The packing disclosed in Japanese Laid-open Patent No. (Sho) 58-11001 belongs to a scope of the above-mentioned self-promoting-fluid-dispersion type structured packing. Such packing is shown in FIG. 8 through FIG. 10. The packing is made of a plurality of thin sheet lattices a, b, c, . . . ; each of the lattices a, b, c, . . . being flexed in a substantially zigzag pattern and formed of thin sheet strips 13'~17' which is inclined to the lattice sections A, B, C, . . . ; and these thin sheet strips 13'~17' are integrated with a flexural section 18' to which a planner cross section of the lattice is formed.

In order to prepare such a packing, band 28' made of metal thin-sheet is cut in a parallel strip 30' connected with a plurality of sections 29'. In this case, the cut-out line portion 31' connected with an adjacent strip 30' has the same length and only half the length is shift with respect to the adjacent cut line portion 31'. Thereafter, the strip 31' may be possibly separated.

However, there are disadvantages in the above packed column type of vapor-liquid contactor in that a higher column should be provided and costs for the production and construction of an apparatus are high, when compared to the sieve tray column type of vapor-liquid contactor having the identical liquid and vapor loads. In this regard, it has been requested to develop a vapor-liquid contactor capable to increase a load, without occurring a flooding by increasing the upper limit of the liquid and vapor loads. It has been also requested to develop a vapor-liquid contactor enabling to vary the production rate in a broad range.

SUMMARY OF THE INVENTION

An object of the present invention is to eliminate the above-mentioned problems of the prior art and to provide a vapor-liquid contactor capable of increasing the load.

The inventors have conducted extensive experiments using a freon which is a liquid having a similar viscosity to a cryogenic material of air components such as nitrogen, oxygen and argon. As a result, the inventors have discovered that a low viscosity liquid of the above-mentioned cryogenic air component is easily dispersed on the surface of the packing such that a vapor-liquid contact of a high efficiency cab be therefore expected. Also, when a vapor-liquid contactor having a self-promoting-fluid-dispersion type structured packing is used, it is difficult to allow the liquid to flow in the downward surface (reverse surface) of the inclined part of the packing whereby a vapor-liquid contact efficiency becomes low. The present invention is made on the above discovery.

In the present invention, a vapor-liquid contactor is characterized by using a non-promoting-fluid-dispersion type structured packing in which various types of thin sheets or tubes for determining a flow direction of the liquid or vapor to the vertical direction are laminated and arranged to conform to the perpendicular direction, and including at least one fluid dispersion unit which comprises a rough distribution part to roughly distribute the liquid and a minute distribution part to minutely and equally distribute the liquid.

Further, the present invention is characterized in that the said non-promoting-fluid-dispersion type structured packing has a specific surface area more than 350 $m^2/m^3$.

Further, the present invention is characterized in that the minute distribution part to minutely and equally distribute the liquid is formed with a self-promoting-fluid-dispersion type structured packing.

Further, the present invention is characterized in that the minute distribution part to minutely and equally distribute said liquid is formed by laminating at least one non-promoting-fluid-dispersion type structured packing and parallel plane sheet group in the axial direction of the column, where the parallel plane sheet group may be a metal.

Further, the present invention is characterized in that said non-promoting-fluid-dispersion type structured packing is formed with a thin metal sheet group or a metal tube group. This thin metal sheet includes aluminum, aluminum alloy, copper, copper alloy, various stainless steel and the like, where a sheet metal net having more than 10 meshes is included.

Further, the present invention is characterized in that said non-promoting-fluid-dispersion type structured packing is formed with various kinds of plastic based thin sheet group or tube group.

Further, the present invention is characterized in that said non-promoting-fluid-dispersion type structured packing has a shape angled in a flow channel cross-sectional pattern. The angled shape includes various shapes of polygons and corrugations of a saw-tooth shape and the like.

Further, the present invention is characterized in that said non-promoting-fluid-dispersion type structured packing has a triangle shape in a flow channel cross-sectional pattern.

Further, the present invention is characterized in that said non-promoting-fluid-dispersion type structured packing has a quadrangular shape such as square, rectangular, trapezoid and rhombus in a flow channel cross-sectional pattern.

Further, the present invention is characterized in that said non-promoting-fluid-dispersion type structured packing is hexagonal in the said flow channel cross sectional pattern.

Further, the present invention is characterized in that said non-promoting-fluid-dispersion type packing comprises a wavy thin sheet formed of a curved surface.

Further, the present invention is characterized in that said non-promoting-fluid-dispersion type packing has more than two cross section patterns selected from the group consisting of a triangle, a quadrangle and a hexagon.

Further, the present invention is characterized in that said non-promoting-fluid-dispersion type structured packing comprises a plurality of thin sheets arranged by a spacer.

Further, the present invention is characterized in that said thin-sheet or spacer has at least one of corrugations, flutings, grooves, alternating-peaks-and-troughs, and/or holes.

Further, the present invention is characterized in that at least one vapor distributor for distributing the vapor is provided at the bottom of said non-promoting-fluid-dispersion type structured packing.

Further, the present invention is characterized in that said vapor distributor is formed with a self-promoting-fluid-dispersion type structured packing.

Further, the present invention is characterized in that said cryogenic air separation unit uses the said vapor-liquid contactor.

According to the present invention, there is provided a gas separation method, the method comprising the step of separating a vapor mixture component from at least two gas components mixture using a vapor-liquid contactor, the improvement being characterized in that said vapor-liquid contactor has a non-promoting-fluid-dispersion type structured packing formed of various types of thin-sheets or tubes to direct the flow of said mixture vertically, arranged in the direction perpendicular to the flow of said mixture; said non-promoting-fluid-dispersion type structured packing has a specific surface area of greater than 350 m²/m³; said vapor mixture and the cryogenic material thereof flow in countercurrent with respect to the surface of the packing under a pressure of from 0.08 to 0.4 MPa while performing vapor-liquid contact; and the loads of the vapor and liquid are so determined that superficial F factor is greater than 1.8 m/s(kg/m³)$^{1/2}$.

Further, according to the present invention, there is provided another gas separation method, the method comprising the step of separating a vapor mixture from at least two gas components mixture using vapor-liquid contactor, the improvement is characterized in that said vapor-liquid contactor has a non-promoting-fluid-distribution type structured packing formed with various types of thin-sheets or tubes to direct the flow of said mixture vertically, arranged in the direction perpendicular to the flow of said mixture; said non-promoting-liquid-distribution type packing has a specific surface area of greater than 350 m²/m³; said vapor mixture and the cryogenic material thereof flow in countercurrent along the surface of the packing under a pressure of from 0.4 to 2.0 MPa, while performing vapor-liquid contact; and the loads of the vapor and liquid is so determined that a superficial F factor is greater than 1.0 m/s(kg/m³)$^{1/2}$.

The vapor-liquid contactor according to the present invention uses as a packing a non-promoting-fluid dispersion type structured packing wherein thin sheets or tubes are laminated or arranged along the perpendicular direction in which various types of shapes for determining a flow direction of said liquid and vapor streams are formed over the perpendicular direction of thin sheet or tube. The vapor-liquid contactor includes at least one liquid distributor consisting of a rough distribution part to distribute the liquid roughly, and a minute distribution part to distribute the liquid minutely and equally. Accordingly, in the liquid distributor, the descending liquid is uniformly distributed over the whole cross-section of the column. Thereafter, in the non-promoting-fluid-distribution type structured packing wherein thin sheets or tubes formed in the perpendicular direction of flow streams are laminated or arranged in the perpendicular direction, a sufficient ascending vapor stream channel is assured by carrying out a vapor-liquid contact, a descending liquid in the surface of the packing is smoothly flowed and an uniformity of thin sheet is retained over the whole sections. The whole surfaces of the packing is effectively used. For this reason, an increase in the pressure loss due to an increase in a flow resistance of the ascending vapor can be reduced, a occurring of flooding can be prevented, a sufficient vapor-liquid contact area can be assured and an efficient distillation can be carried out. Accordingly, the load of the liquid and vapor can be established highly.

Further, the height of the column can be set lower. The costs required for the preparation and construction of the apparatus can be reduced. In addition, the product output can increased and reduced largely.

BRIEF DESCRIPTION OF THE DRAWINGS

Embodiments of the invention will now be described with reference to the accompanying drawings, in which:

In FIGS. 1 to 31, each of the reference numbers is denoted as follows:

2 . . . high pressure column, 2a, 3a, 4a . . . vapor-liquid contactor,

3 . . . low pressure column, 4 . . . argon column, 41, 51, 61 . . . liquid distributor, 91, 101, 111, 121, 131, 141, 151, 161 . . . non-promoting-fluid dispersion type structured packing, 92, 102, 132, 152 . . . thin sheet, 96, 106, 116, 126, 166a, 166b . . . flow channel, 162 . . . tube, $A_1$, $A_2$, $A_3$ . . . non-promoting-fluid dispersion type structured packing, $B_1$, $B_2$, $B_3$ . . . minute distribution part, $C_1$, $C_2$, $C_3$ . . . rough distribution part, $E_1$, $E_2$ . . . liquid distributor, 85, 86 . . . parallel plane sheet group.

EMBODIMENTS OF THE INVENTION

Figure 1:
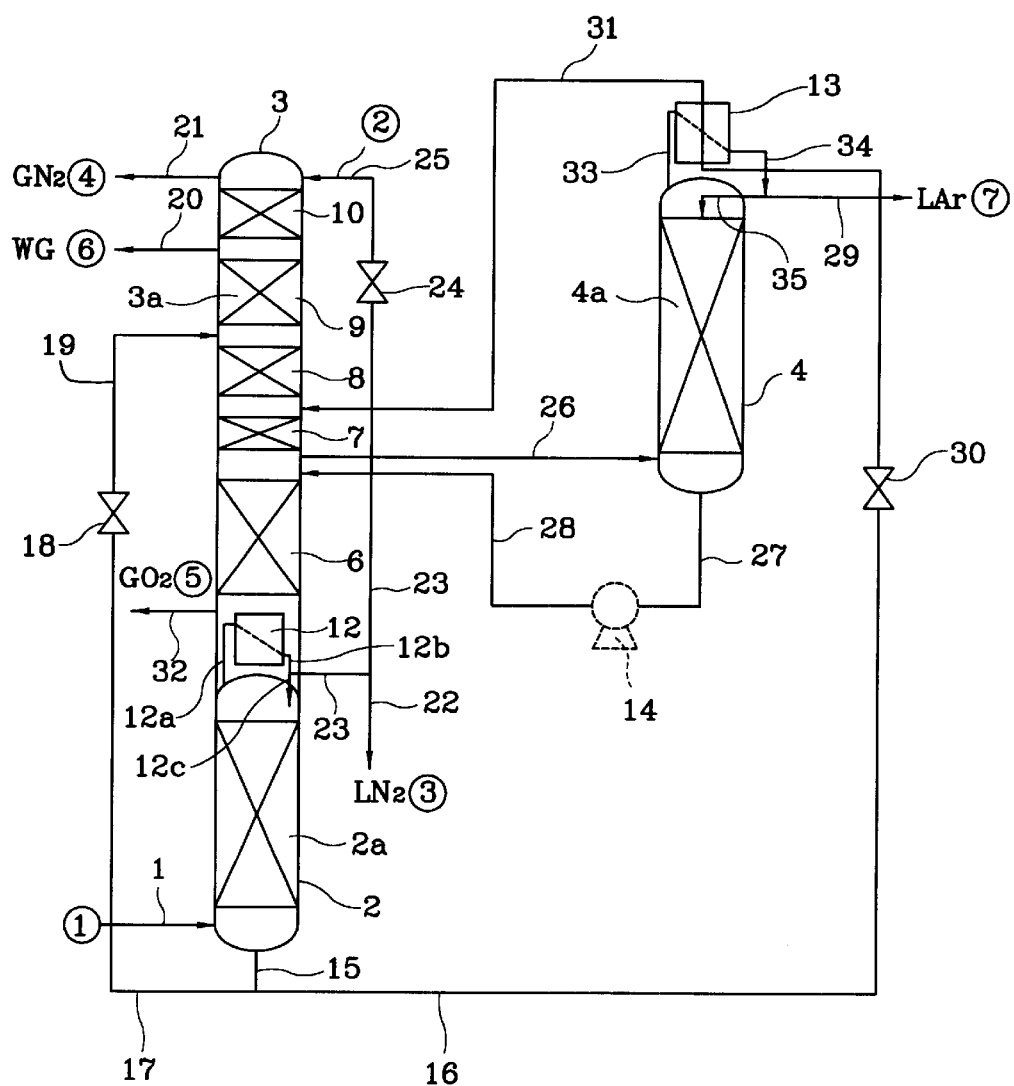
FIG. 1 is a schematic view of a cryogenic air separation unit using one embodiment of the vapor-liquid contactor in accordance with the present invention.
Figure 2:
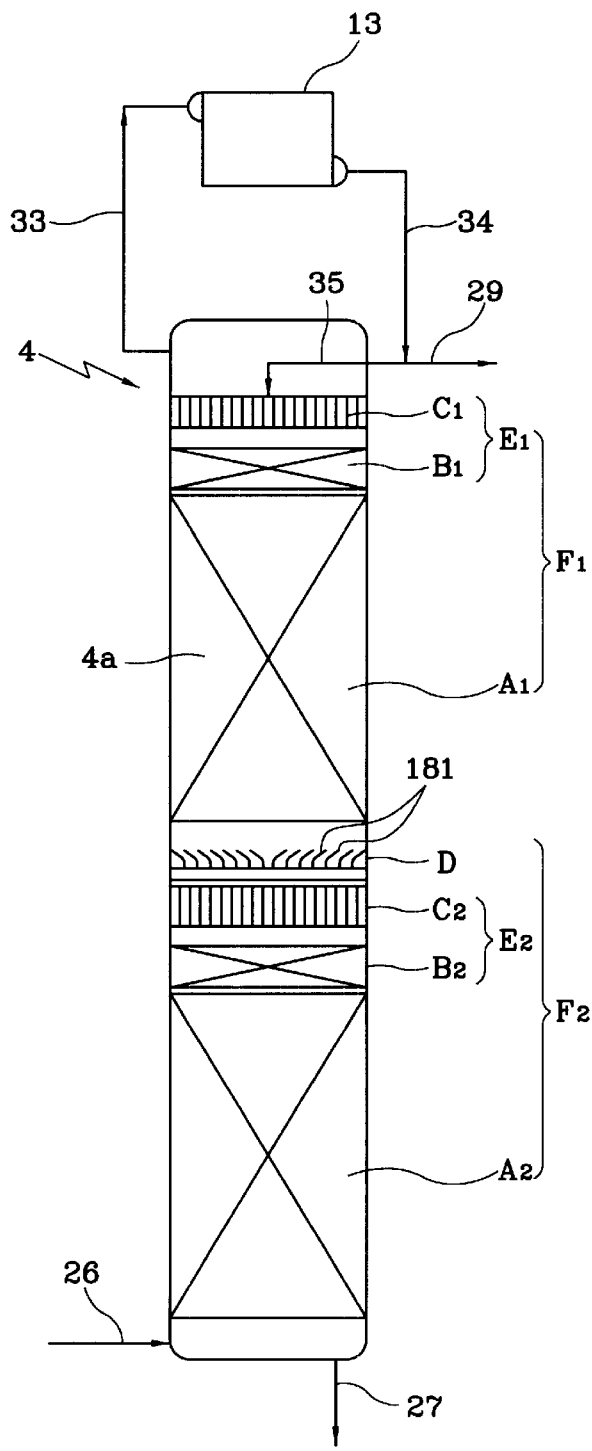
FIG. 2 is a schematic view showing one example of the vapor-liquid contactor used in the cryogenic gas separation unit as shown in FIG. 1.

FIGS. 1 and 2 show a cryogenic air separation unit using the vapor-liquid contactor in accordance with the present invention. The cryogenic air separation unit shown herein comprises a high pressure column 2, a low pressure column 3 and a crude argon column 4. The high pressure column 2 is formed of a vapor-liquid contactor 2a. The low pressure column 3 is formed of a vapor-liquid contactor 3a. This vapor-liquid contactor 3a is divided into each contacting sections 6~10 over the top portion of the column from the bottom portion of the column 3. The crude argon column 4 is formed of a vapor-liquid contactor 4a. Also, a condenser 12 is mounted near the bottom portion in the low pressure column 3, and a crude argon column condenser is mounted in the upper portion of the crude argon column 4.

Hereinafter, the vapor-liquid contactor 4a of the embodiment that constitutes a crude argon column 4 is explained in detail.

As shown in FIG. 2, the vapor-liquid contactor 4a is installed in a cylindrical container that forms a column, and includes a liquid distributor $E_1$ mounted with a minute distributor $B_1$ downwardly a rough distribution part $C_1$; a non-promoting-fluid dispersion type structured packing $A_1$; a liquid collector D; a liquid distributor $E_2$ mounted with a minute distribution part $B_2$ downwardly the rough distribution part $C_2$; and a non-promoting-distribution type structured packing $A_2$, over the base portion from the peak portion of the column.

Hereinafter, the liquid distributor $E_1$ and the non-promoting-fluid dispersion type structured packing $A_1$ are referred to as a liquid distribution and vapor-liquid contact portion $F_1$. The liquid collector D, liquid distributor $E_2$ and non-promoting-fluid dispersion type structured packing $A_2$ are referred to as a liquid collection, distribution and vapor-liquid contact portion $F_2$.

Figure 4:
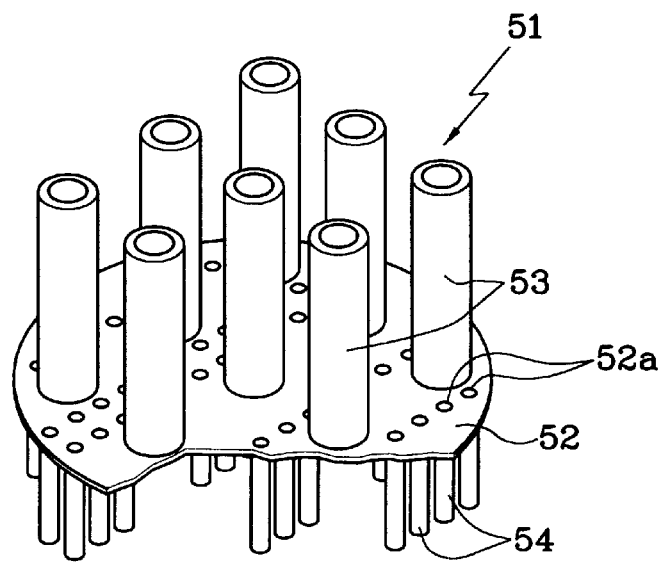
FIG. 4 is a perspective view showing another example of the rough distribution part used in the vapor-liquid contactor as shown in FIG. 2.
Figure 5:
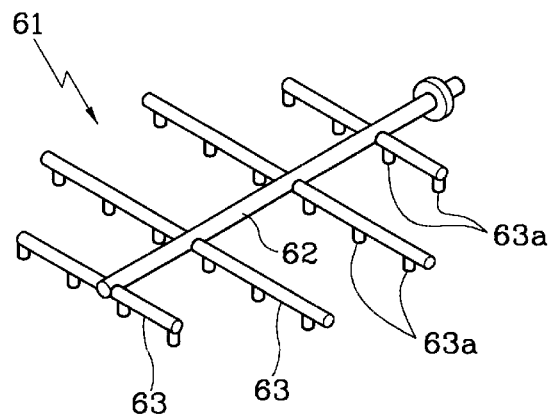
FIG. 5 is a perspective view showing another example of the rough distribution part used in the vapor-liquid contactor as shown in FIG. 2.

The rough distribution part $C_1$, $C_2$ is to distribute a descending liquid roughly in order to aim at an uniform over the column cross-section of a descending liquid stream in the column. In the rough distribution part $C_1$, $C_2$, a liquid distributor shown in FIGS. 3 to 5 is preferably used.

Figure 3:
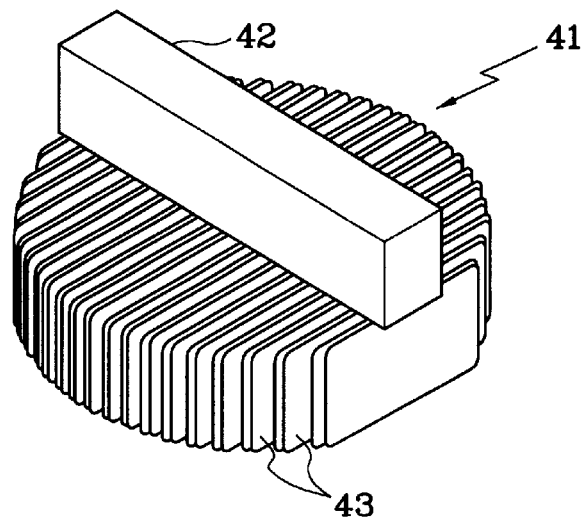
FIG. 3 is a perspective view showing one example of the rough distribution part used in the vapor-liquid contactor as shown in FIG. 2.

The liquid distributor 41 shown in FIG. 3 is referred to as a channel type. Therefore, the distributor 41 comprises a first distribution box 42 of rectangular parallelepipeds mounted along a radial direction of the column, and a plurality of second distribution boxes 43 of rectangular in cross-section attached to in intervals along the rectangular direction of the distribution box 42 in the downward of the distribution box 42.

The first distribution box 42 is a box-like material of the upper opening and is provided so that their two ends are formed to reach near the inner wall of the column and stored temporally in the inside of a descending liquid. The distribution hole (not shown) which distributes the liquid in the distribution box 42 to the second dispersion box 43 is provided near the bottom portion of the distribution box 42.

The second distribution box 43 is a box-like material arranged in the perpendicular direction, and is provided so that their two ends are formed to reach near the inner wall of the column, and the liquid outflowing through a distribution hole mounted in the bottom portion of the column from the distribution box 42 is uniformly dropped over the whole cross-section.

The liquid distributor 51 shown in FIG. 4 is called as a vapor chimney type, and includes a liquid receiving tray portion 52 mounted to conform to a horizontal surface, a plurality of cylindrical chimney tubes 53 mounted at the upper location of the tray 52, and a plurality of pipe branch part 54 mounted in the downward of the liquid receiving tray portion 52.

The tray portion 52 is formed so that its peripheral part is extended to the inner wall of the column. The tray portion 52 is provided with a plurality of distribution holes 52a over the whole section, wherein a descending liquid is temporarily stored in a liquid receiving tray portion 52 and then dropped down in the uniformly dispersed state over the whole cross-section of the column via a distribution hole 52a and a branch portion 54 (open pipe in the upper and lower edges). The upper and lower ends of the chimney portion 53 are open, and a vapor ascending the inner portion of the column is passed through the upward of a liquid distributor 51 via the inner part of chimney 53.

The liquid distributor 61 shown in FIG. 5 is referred to as a spray type, and includes a main tube portion 62 wherein a descending liquid in the column is in-fluxed, and a plurality of branch pipe portion 63 mounted in interval in the longitudinal direction of the main tube portion 62.

A main tube portion 62 and a branch tube portion 63 are provided so that the two ends can reach near the inner wall of the column. The main tube portion 62 is connected with a liquid receiving portion (not shown) wherein a descending liquid in the column is guided to the main tube portion 62, and is provided so that a descending liquid can be guided to the inner of the main tube portion 62.

A branch tube portion 63 is provided so that its inner space is communicated in the inner space of the main tube portion 62, and that a liquid in the main tube portion 62 is in-flowed in the branch tube portion 63. The branch tube portion 63 is mounted with a plurality of distribution holes 63a in interval along the whole longitudinal direction, and is provided so that a liquid in the branch tube portion 63 is dropped down in an uniformly dispersed state along the whole cross-section of the column through a distribution hole.

The minute distribution part $B_1$, $B_2$ of the vapor-liquid contactor 4a is provided so that a descending liquid roughly distributed by the rough distribution part $C_1$, $C_2$, is further minutely and uniformly distributed along the whole cross section of the column. The structure of the minute distribution part $B_1$, $B_2$ is explained below.

As the minute distribution part $B_1$, $B_2$, a self-promoting-fluid dispersion type structured packing is preferably used. The self-promoting-fluid dispersion type structured packing is a packing having the pattern and structure in which a descending liquid stream and an ascending vapor stream come into a vapor-liquid contact on the surface of said structured packing, with the liquid stream and the vapor stream being flowed in countercurrent with respect to the main stream along the axial direction of the column, and the vector of the liquid stream and the vapor stream is produced in the direction perpendicular to the main stream, to thereby promote the mixing of the two and carry out the vapor-liquid contact. The self-promoting-fluid dispersion type structured packing is also called a packing in which a thin sheet made of aluminum, copper, alloy of aluminum and copper, stainless steel, various types of plastics and the like is formed in various structured patterns to have a block pattern of stacked structure. Further, the present invention includes a case when said thin sheet is sheet-like metal gauge of greater than 10 mesh. Structured packing is also called regular packing.

The specific examples of the self-promoting-fluid dispersion type structured packing are shown in FIGS. 6 to 10.

Figure 6:
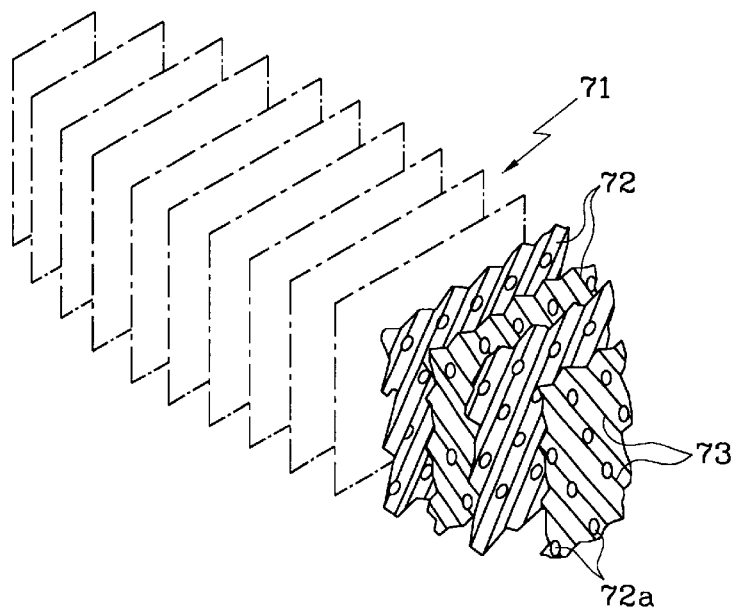
FIG. 6 is a perspective view showing one example of the self-promoting-fluid-dispersion type structured packing used as the minute distribution part in the vapor-liquid contactor as shown in FIG. 2.

The self-promoting-fluid dispersion type structured packing 71 shown in FIG. 6 is disclosed in Japanese Patent Publication No. (Sho) 57-36009 wherein a plurality of thin sheets 72 having a wave pattern formed of aluminum etc. are arranged in parallel to the axial line of the column, laminated to contact with each other and formed in a block pattern. Therefore, the wavelike groove 73 of each thin sheet 72 is inclined with respect to an axial line of the column, and an adjacent wave-like thin sheet 72 is arranged so that a direction of forming the wave-like groove 73 is intersected. Further, the reference number 72a denotes a hole mounted in a thin sheet 72.

Figure 7:
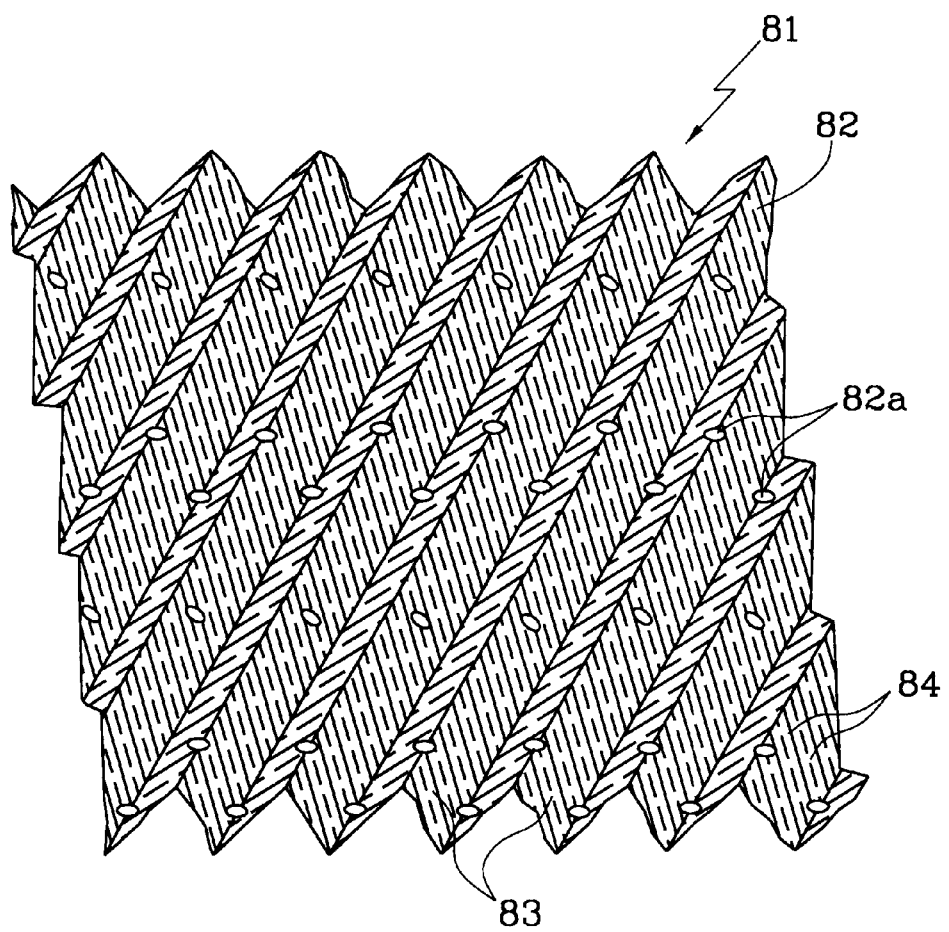
FIG. 7 is a perspective view showing another example of the self-promoting-fluid-dispersion type structured packing used as the minute distribution part in the vapor-liquid contactor as shown in FIG. 2.

FIG. 7 shows a thin sheet 82 that forms a structural unit of the self-promoting-fluid dispersion type structured packing 81 as disclosed in Japanese Patent Laid-open No. (Sho) 54-16761. This thin sheet 82 is characterized in that it forms a wave pattern to make a wave-like groove 83 and that the thin sheet 82 is further provided with a fine wave-like groove 84 formed at a given angle relative to a wave-like groove 83. Further, the reference number 82a denotes a hole formed by a thin sheet 82.

Figure 8:
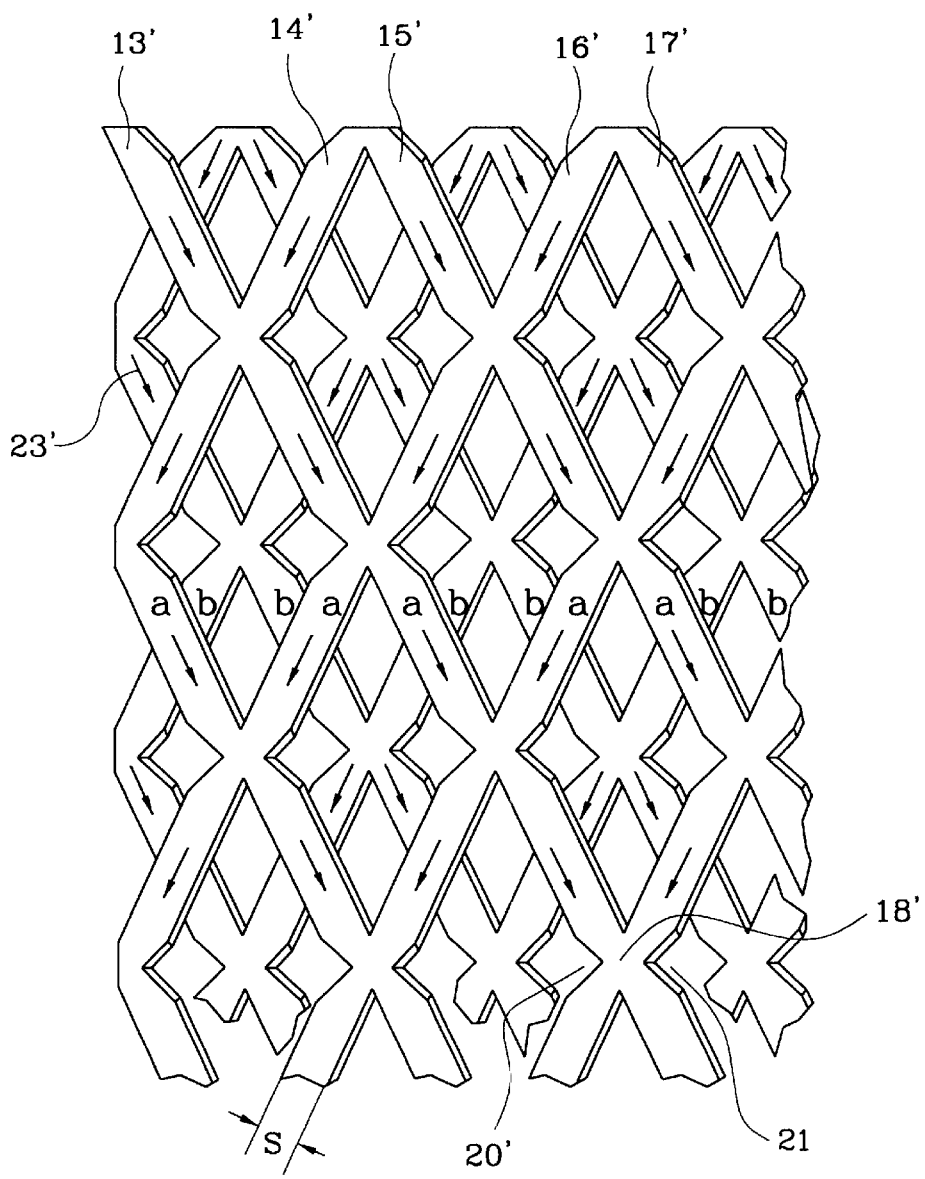
FIG. 8 is a front view showing a further example of the self-promoting-fluid-dispersion type structured packing used as the minute distribution part in the vapor-liquid contactor as shown in FIG. 2.
Figure 9:
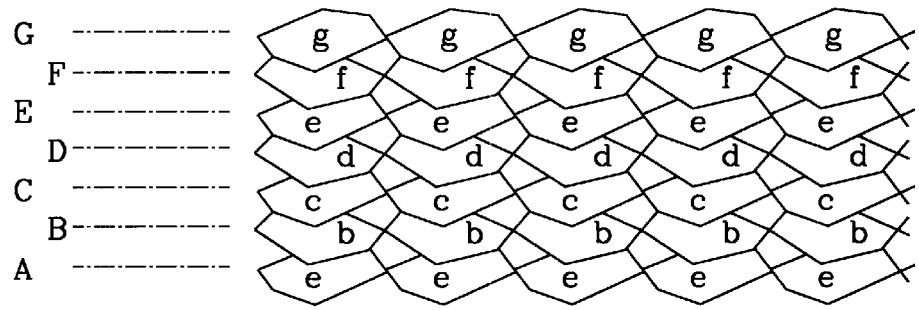
FIG. 9 is a cross-section view of the self-promoting-fluid-dispersion type structured packing as shown in FIG. 8.

FIGS. 8 and 9 illustrate another example of the self-promoting-fluid dispersion type structured packing which is disclosed in Japanese Patent Laid-open No. (Sho) 58-11001. The self-promoting-fluid dispersion type structured packing disclosed herein has been developed for the purpose of distributing the liquid so that it may obtain a liquid surface as largely as possible for the mass and heat exchange. Therefore, this structured packing is formed of a plurality of thin sheet lattices a, b, c, . . . ; each lattice a, b, c, . . . is flexed in a zig-zag pattern and formed of thin sheet strips 13'~17' which are inclined to each lattice sections A, B, C; these thin sheet strips 13'~17' are united with a flexural area 18' and is a packing forming of a planner cross area of the lattice; the thin sheet strips 13'~17' extended to the flow direction is an intersecting area 18'; the liquid phase 23' flowing in the downward of an intersecting area 18' through thin sheet strips 13'~17' is formed so as to convey to thin sheet area of sheet strips 13~17 of adjoining via at least a partial intersecting area 18'.

With respect to the intersecting area 18', notch 20', 21' are formed of outside the thin sheet strips 13'~17'.

The notch 20', 21' are disposed in the direction extending thin sheet strips 13'~17' in zigzag pattern, wherein it is formed in a more long than the width s of the thin sheet strips 13'~17' and in a more deeply than half the width s in the perpendicular direction relative to the thin sheet strips 13'~17'. Further, the thin sheet strips 13'~17' is directly laminated and overlapped with each other.

Moreover, the intersecting area 18' of thin sheet strips 13'~17' may form of a hole and/or a sideward notch. Also, the thin strip of each thin sheet strips 13'~17' which is consecutively connected in zigzag pattern may alternatively form of a hole and/or a sideward notch.

Figure 10:
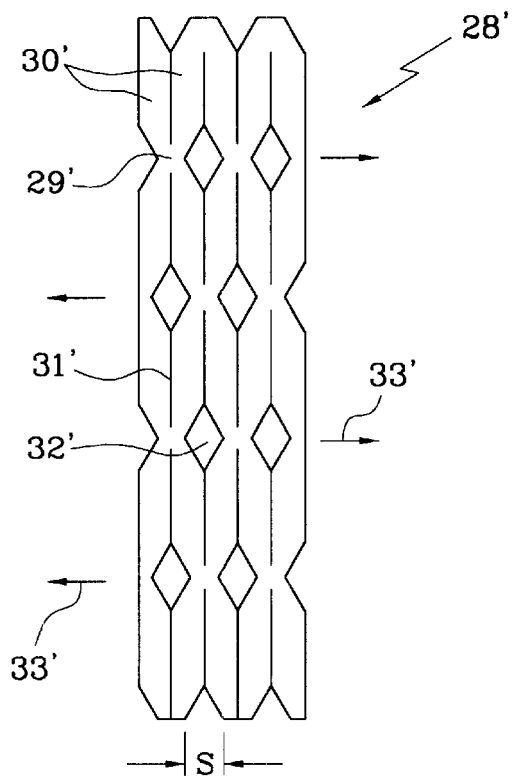
FIG. 10 is a detailed view of the method for preparing the self-promoting-fluid-dispersion type structured packing as shown in FIG. 8.

As shown in FIG. 10, the packing is, by introducing a cut net in a thin sheet-like metal band 28', formed of a plurality of parallel strips 30' connected with a plurality of areas 29'; a twill-like hole 32' is formed in this cut portion 31' and then metal band 28' is extended in the direction 31' which is a perpendicular direction relative to strip 30'; a plurality of the resulting thin sheet lattices having a rhombus lattice pattern are laminated and prepared in block pattern.

This packing has advantages in that despite a low material cost, a large packing surface may be obtained. Such advantages is apparent that in view of the structure of thin strips, the thin strips have a large surface in comparison to a material cost.

Next, the structure of the non-promoting-fluid dispersion type structured packing $A_1$, $A_2$ is explained in detail.

The non-promoting-fluid dispersion type structured packing is a packing in which a liquid stream descending in the column and a vapor stream ascending in the column are flowed in countercurrent with respect to their surfaces, and it has a pattern and structure for carrying out a vapor-liquid contact, without promoting mixing of the liquid stream and vapor stream in the direction of the cross-section vertical to the axis of the column. A plurality of thin sheets, tubes and the like determining the flow direction of said liquid and vapor is arranged in parallel to the main flow direction (column axial direction).

The materials of said thin sheets and tubes may include aluminum, copper, alloy of aluminum and copper, stainless steel, various kinds of plastics and the like. Among them, a easily moldable metal is preferably employed.

Moreover, the main streams denote a liquid stream descending along the axial direction of the column and vapor stream ascending along the axial direction of the column. The main streams also denotes a flow in the axial direction relative to the flow of material transfer which is produced on the surface (i.e., surface layer) of the liquid stream and the vapor stream in the packing surface.

Specific examples of the non-promoting-fluid dispersion type structured packing $A_1$, $A_2$ are shown in FIGS. 11 to 24.

Figure 11:
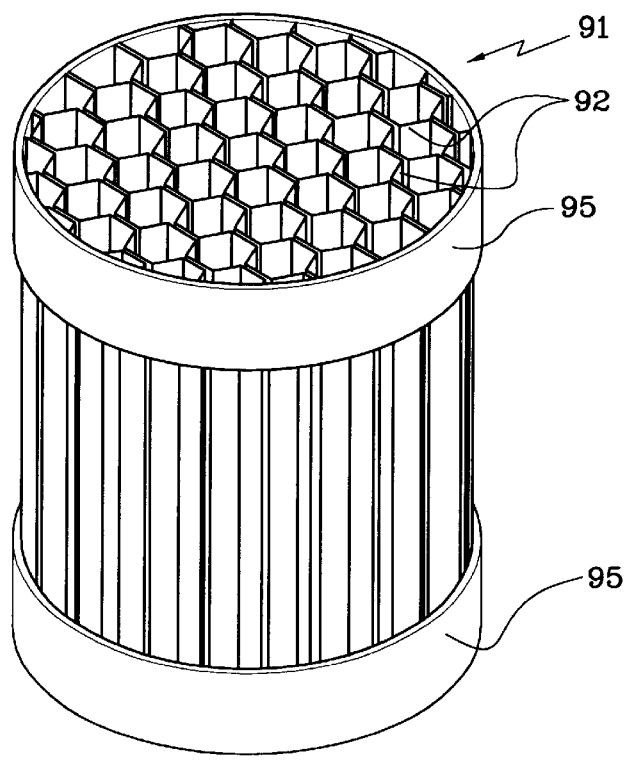
FIG. 11 is a perspective view showing one example of the non-promoting-fluid-dispersion type structured packing used in the vapor-liquid contactor as shown in FIG. 8.
Figure 12:
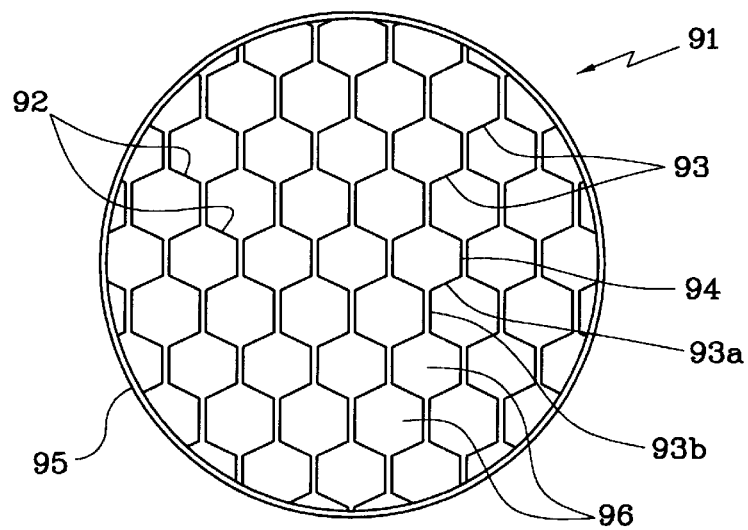
FIG. 12 is a cross section view showing the non-promoting-fluid-dispersion type structured packing as shown in FIG. 11.
Figure 13:
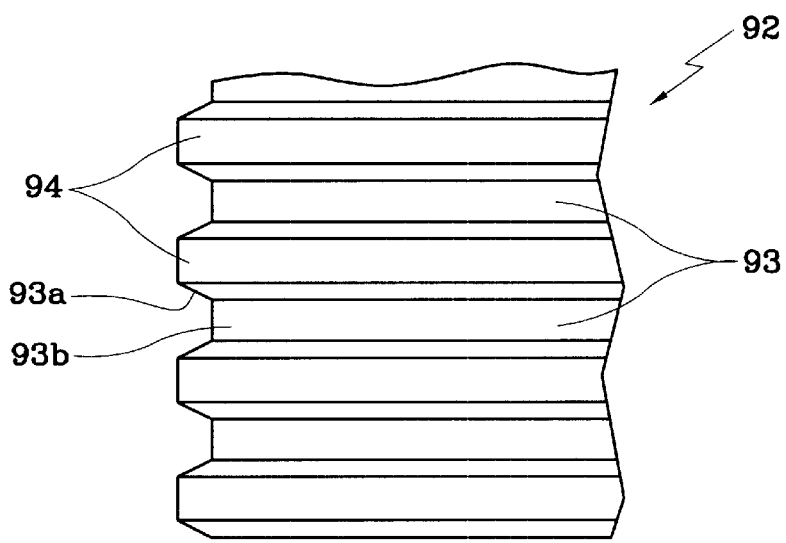
FIG. 13 is a perspective view showing a thin sheet of the non-promoting-fluid-dispersion type structured packing as shown in FIG. 11.

In the non-promoting-fluid dispersion type structured packing 91 shown in FIGS. 11 to 13, the thin sheet 92 is laminated as a plurality of layers and the laminated layers are fixed each other by a wiper-band 95.

The thin sheet 92 is subjected to a flexural finishing of the thin sheet formed of said metal, plastics and the like and is formed of a plurality of parallel grooves 93 in interval.

The groove 93 is formed so that the width is slowly narrowed in the depth direction. The groove 93 comprises a inclined portion 93a relative to the bottom 94 and a parallel bottom portion 93b relative to the bottom portion 94.

In the thin sheet 92, the bottom portion 94 and groove 93 are laminated in opposite direction. In the non-promoting-fluid dispersion type structured packing 91, a space of thin sheet 92, i.e., a space of compartment by opposite two groove 93 or by opposite two bottom portion 94 has a hexagonal pattern in the cross section. This space becomes a flow channel 96 of an ascending vapor and a descending liquid at the time of distillation operation.

The non-promoting-fluid dispersion type structured packing 91 is provided in the inner of the column so that a thin plate 92 is disposed in parallel to the column axial (perpendicular) direction which is a main flow direction.

Figure 14:
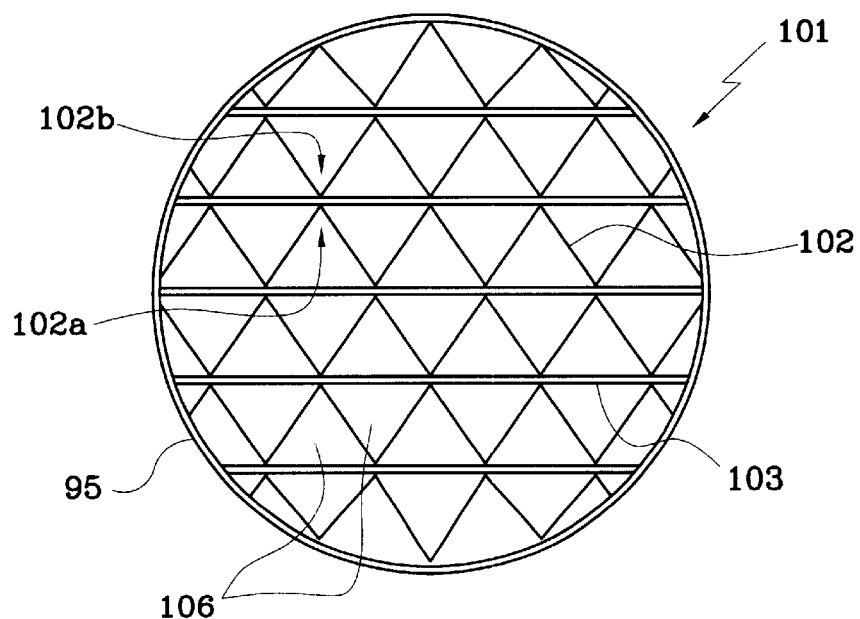
FIG. 14 is a cross-sectional view showing another example of the non-promoting-fluid-dispersion type structured packing used in the vapor-liquid contactor as shown in FIG. 2.

In the non-promoting-fluid dispersion type structured packing 101 shown in FIG. 14, a plurality of triangle flexural sheets 102 made by subjecting a thin sheet formed of said metal, plastics and the like to a flexural finishing and then molding them in a triangle wave-pattern, are laminated through a plate-like spacer 103 formed of metal, plastics and the like, and these are fixed each other via a wiper-band 95.

In the non-promoting-fluid dispersion type structured packing 101 shown herein, the position of a triangle flexural sheet 102 is determined so that the top 102a of triangle flexural sheet 102 is positioned near the bottom portion 102b of the adjacent triangle flexural sheet 102. In this non-promoting-fluid dispersion type structured packing 101, a triangle flexural sheet 102 having a triangle wave pattern is laminated through a sheet-like spacer 103. Therefore, the space between a triangle flexural sheet 102 and spacer 103 forms a plurality of flow channels 106 having triangle cross-section which forms a compartment by the triangle flexural sheet 102 and spacer 103.

The triangle flexural sheet 102 may form so that a cross-section shape of flow channel 106 is in a regular triangle. For example, this may be formed in an equilateral triangle and in an inequilateral triangle.

Figure 15:
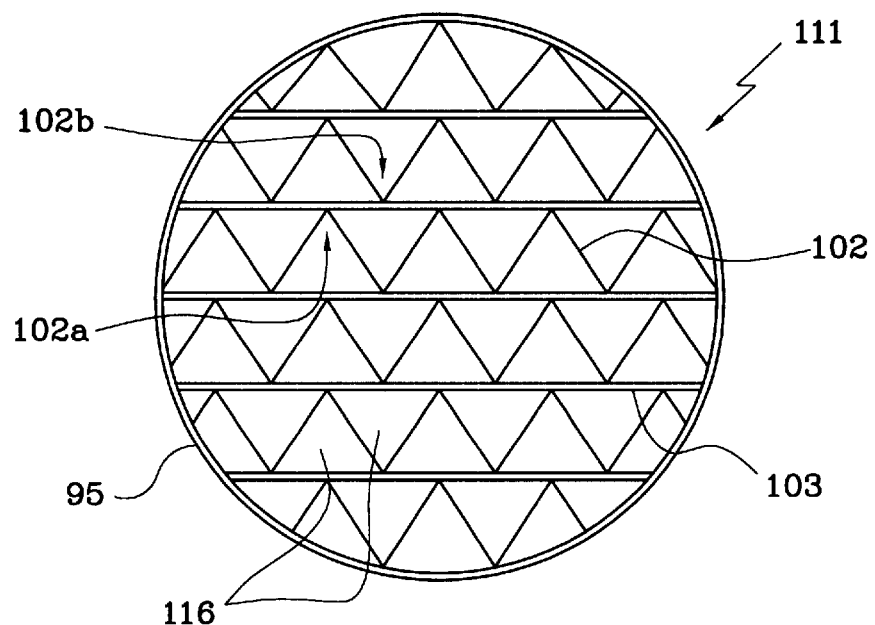
FIG. 15 is a cross-sectional view showing a further example of the non-promoting-fluid-dispersion type structured packing used in the vapor-liquid contactor as shown in FIG. 2.

In the non-promoting-fluid dispersion type structured packing 111 shown in FIG. 15, the position of the triangle flexural sheet 102 is determined so that the top portion 102a of the triangle flexural sheet 102 and the top portion 102b of the adjacent triangle flexural sheet 102 are separated each other. In this respect, the non-promoting-fluid dispersion type structured packing 111 is different from said non-promoting-fluid distribution type structured packing 101.

In this non-promoting-fluid dispersion type structured packing 111, a space between a triangle flexural sheet 102 and a spacer 103 forms a plurality of cross-section triangle flow channels 116 which form a compartment by the triangle flexural sheet 102 and spacer 103.

Figure 16:
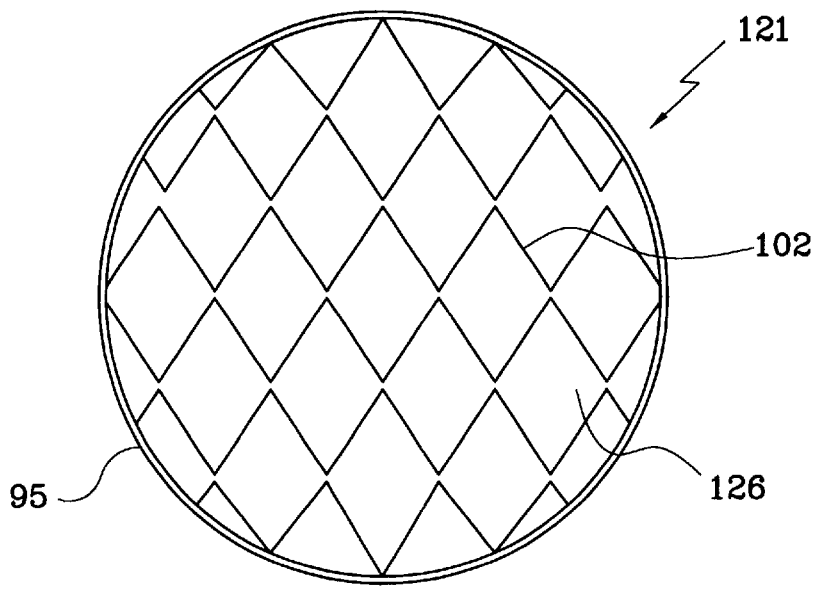
FIG. 16 is a cross-sectional view showing a further example of the non-promoting-fluid-dispersion type structured packing used in the vapor-liquid contactor as-shown in FIG. 2.

In the non-promoting-fluid dispersion type structured packing 121 shown in FIG. 16, a triangle flexural sheet 102 is stacked, not interposing a spacer 103, in the non-promoting-fluid dispersion type structured packing 101 shown in FIG. 14.

In this non-promoting-fluid dispersion type structured packing 121, the position of a triangle flexural sheet 102 is determined so that the top portion 102a of the triangle flexural sheet 102 is arranged, in the same manner as packing 101, near the bottom portion 102b of the adjacent triangle flexural sheet 102. Therefore, a space between the triangle flexural plate 102 forms a cross square flow channel 126 which has a shape combined with a cross-section triangle flow channel 106.

In that case, the triangle flexural sheet 102 may form so that the cross-section of the flow channel 126 forms various types of shapes such as a square, a rectangle, a trapezoid, a rhombus, etc.

Figure 17:
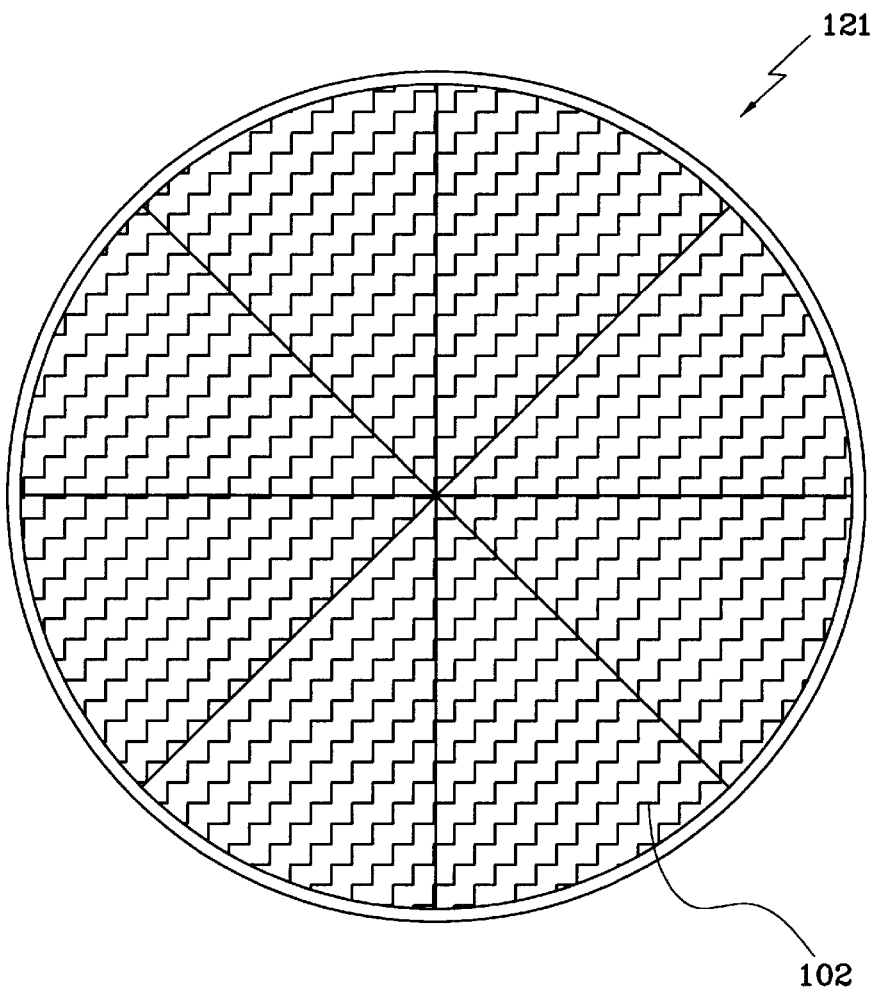
FIG. 17 is a cross-sectional view showing a further example of the non-promoting-fluid-dispersion type structured packing used in the vapor-liquid contactor as shown in FIG. 2.

In the non-promoting-fluid dispersion type structured packing 121' shown in FIG. 17, the position of a triangle flexural sheet 102 is determined so that the top portion 102a of the triangle flexural sheet 102 and the bottom portion 102b of the adjacent triangle flexural sheet 102 are separated each other. A plurality of spacers (not shown) may be interposed in interval in the column axial direction between these triangle flexural sheets 102.

Figure 18:
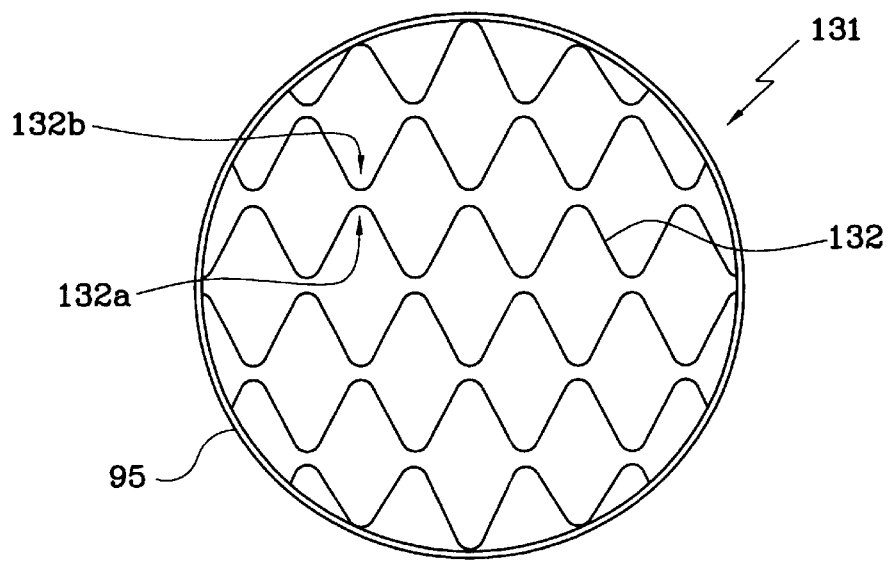
FIG. 18 is a cross-sectional view showing a further example of the non-promoting-fluid-dispersion type structured packing used in the vapor-liquid contactor as shown in FIG. 2.

In the non-promoting-fluid dispersion type structured packing 131 shown in FIG. 18, the thin sheet formed with said metal, plastics, etc. is subjected to a flexural finishing, a plurality of wave sheets 132 formed in a wavy pattern having curved surface are stacked, and these are fixed each other via wiper-band 95. The wave sheets 132 formed that alternating-peaks-and-troughs, are provided of curved pattern in cross section.

In the non-promoting-fluid dispersion type structured packing 131 shown in FIG. 18, a peak and bottom in the wavy pattern is rounded at the each corner thereof. The position of a wave sheet 132 is determined so that the top portion 132a of wave sheet 132 is arranged near the bottom portion 132b of the adjacent wave sheet 132.

Figure 19:
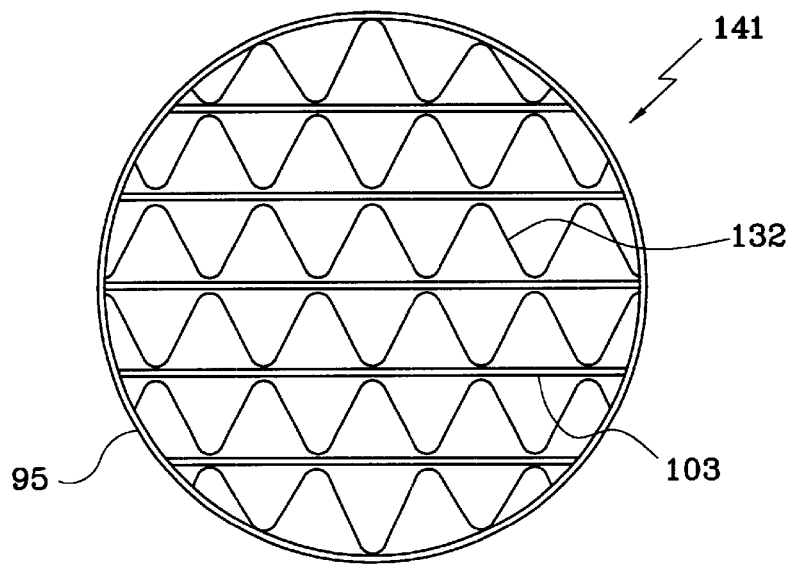
FIG. 19 is a cross-sectional view showing a further example of the non-promoting-fluid-dispersion type structured packing used in the vapor-liquid contactor as shown in FIG. 2.

The non-promoting-fluid dispersion type structured packing 141 shown in FIG. 19 is to arrange a spacer 103 between wave sheet 132 in said non-promoting-fluid dispersion type structured packing 131.

Figure 20:
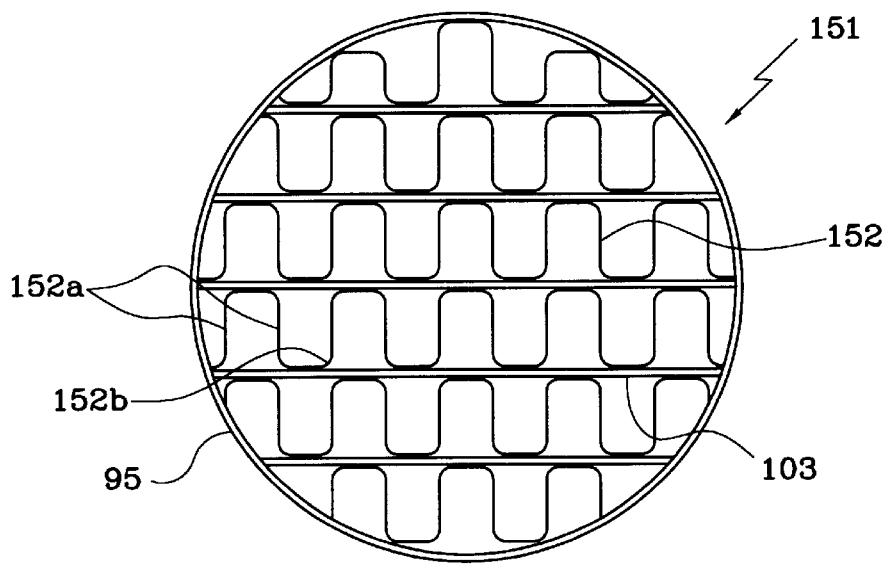
FIG. 20 is a cross-sectional view showing a further example of the non-promoting-fluid-dispersion type structured packing used in the vapor-liquid contactor as shown in FIG. 2.

In the non-promoting-fluid dispersion type structured packing 151 shown in FIG. 20, the wave sheet 152 is formed in a wave pattern having a plane sheet portion 152a and a flexural curved portion 152b in a substantially vertical direction relative to spacer 10. In this respect, the non-promoting-fluid dispersion type structured packing 151 is different from said non-promoting-fluid dispersion type structured packing 141.

Figure 21:
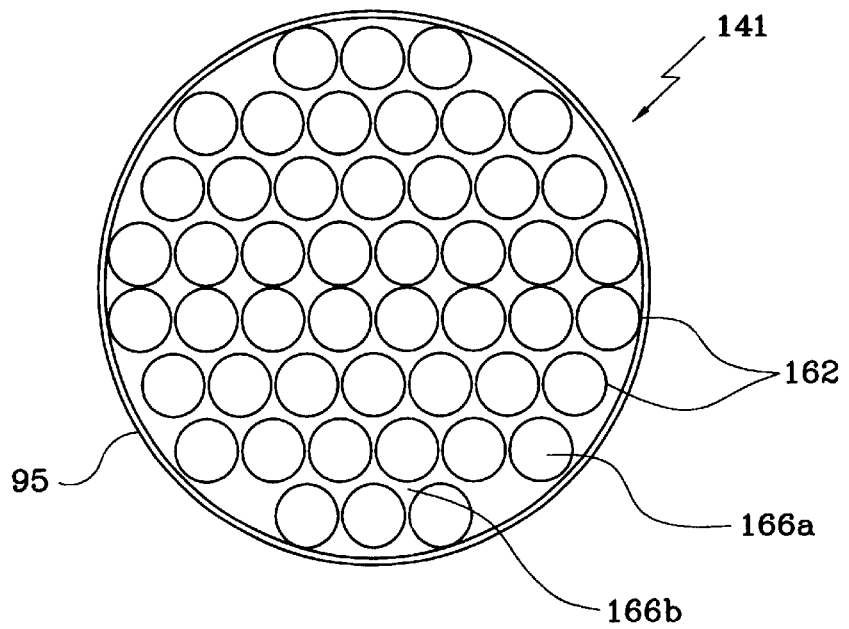
FIG. 21 is a cross-sectional view showing al further example of the non-promoting-fluid-dispersion type structured packing used in the vapor-liquid contactor as shown in FIG. 2.

In the non-promoting-fluid dispersion type structured packing 161 shown in FIG. 21, a cylindrical tube 162 formed of said metal, plastics and the like is collected, and they are fixed each other via a wiper-band 95.

In this non-promoting-fluid dispersion type structured packing 161, the inner portion of the tube 162 forms a cross-sectional cylindrical flow channel 166a. Also, the portion of compartment by a peripheral section of the tube 162 forms a flow channel 166b.

Figure 22:
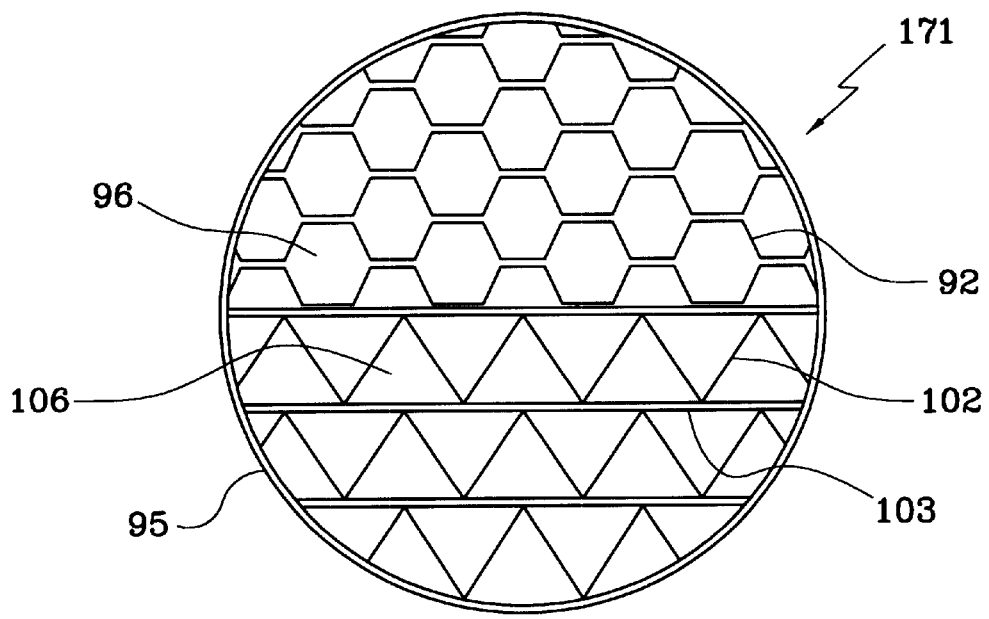
FIG. 22 is a cross-sectional view showing a further example of the non-promoting-fluid-dispersion type structured packing used in the vapor-liquid contactor as shown in FIG. 2.

Further, the shape of the tube 162 may include polygon such as an oval, a triangle, a square and the like, but these are not particularly limited to aforesaid shapes. The non-promoting-fluid dispersion type structured packing 171 shown in FIG. 22 is to combine the non-promoting-fluid dispersion type structured packing 91 shown in FIGS. 11–13 with the non-promoting-fluid dispersion type structured packing 111 shown in FIG. 15. The packing 171 includes a flow channel 96 of cross section hexagon and a flow channel 116 of cross-section triangle.

Where these non-promoting-fluid dispersion type structured packings 91, 101, 121, 121', 131, 141, 151, 161, 171 are provided in the inner portion of the column, all the flexural shapes of sheets 92, 102, 132, 152 forming these packing are in the perpendicular direction, and spacer 103 and tube 162 are arranged in parallel in the column axial (perpendicular) direction which is a main flow direction.

In the packing shown in FIGS. 14, 15, 19, 20 and 22, if spacer 103 can be determined by a relative position of thin sheet, not conforming from the top edge to the bottom edge of the longitudinal cross-section of one packing block is acceptable and it may serve as a spacer partially interposed between thin sheets. The thickness of spacer 103 may range from 0.2 to 0.5 mm.

Figure 23:
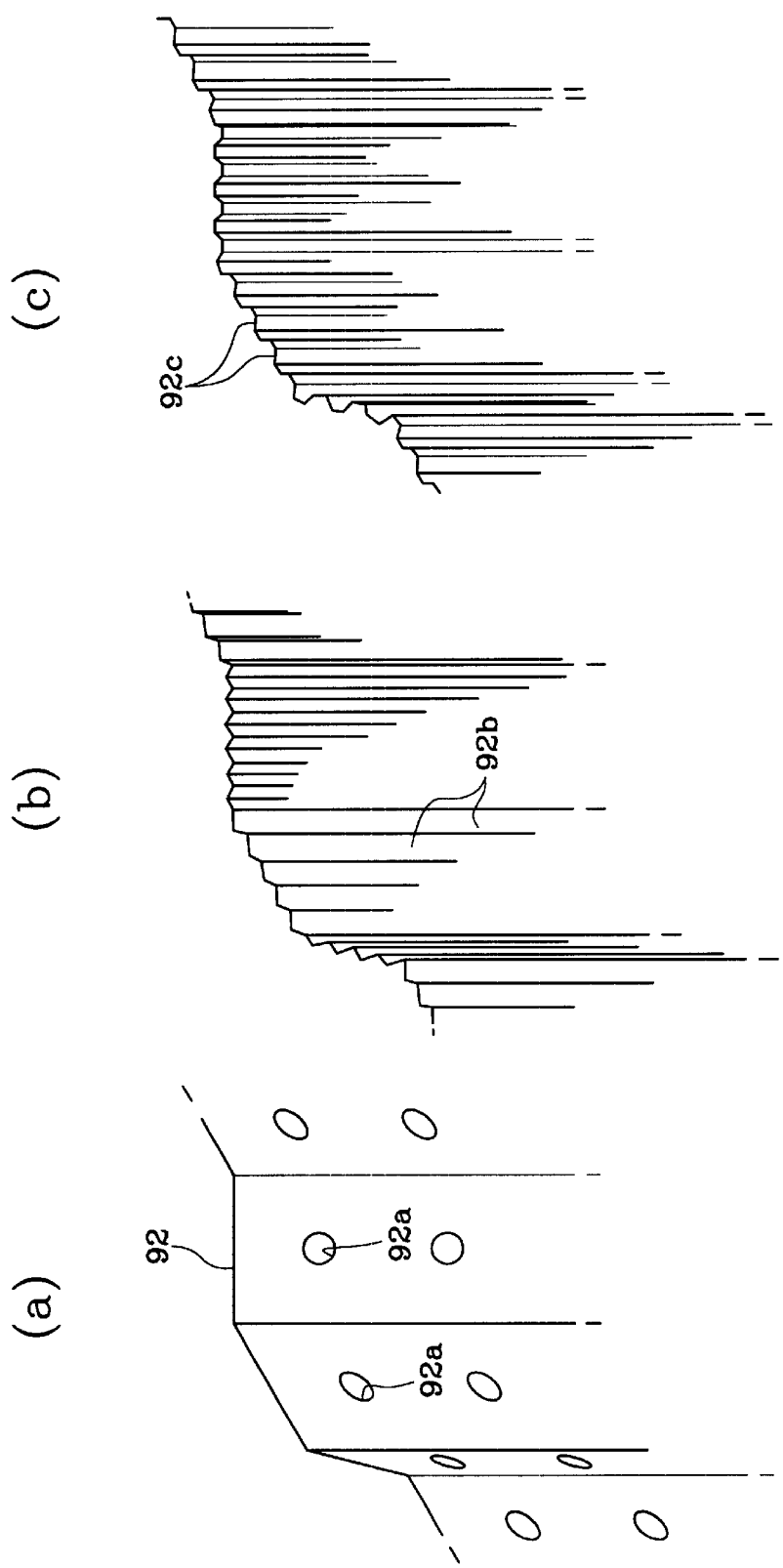
FIG. 23 is a perspective view showing a modified example of the non-promoting-fluid-dispersion type structured packing as shown in FIGS. 11 to 13.
Figure 24:
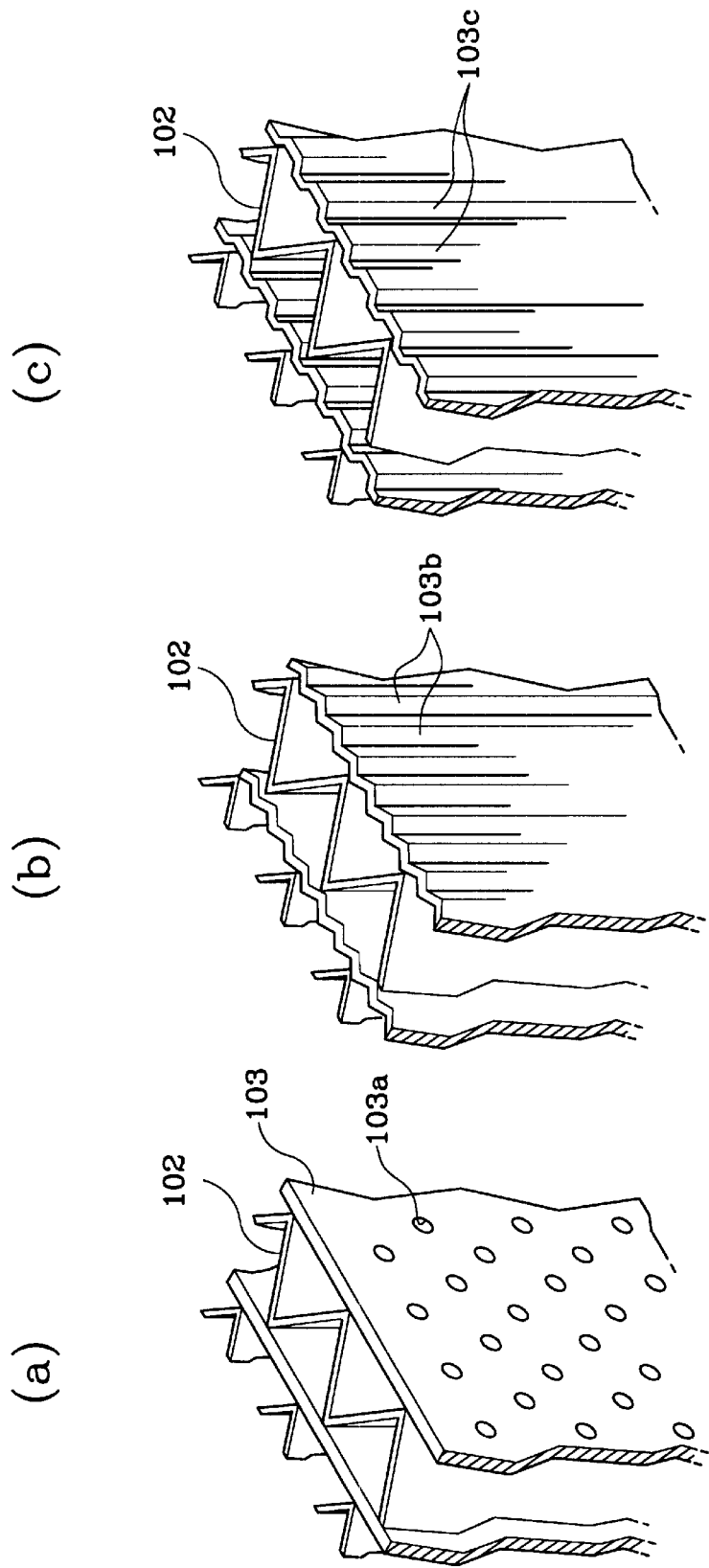
FIG. 24 is a perspective view showing a modified example of the non-promoting-fluid-dispersion type structured packing as shown in FIG. 15.

The thin sheet and spacer that constitute the non-promoting-fluid dispersion type structured packing may include at least one of corrugations, grooves and/or holes in order to increase a vapor-liquid contact efficiency. Specific examples are shown in FIGS. 23 and 24.

FIG. 23(a) shows a structure mounted with a hole 92a in the thin sheet 92 in the same manner as that employed in the non-promoting-fluid dispersion type structured packing 91.

FIG. 23(b) shows a structure provided with corrugations of a sawtooth shape 92b in the thin sheet 92.

FIG. 23(c) shows a structure provided with corrugations of a groove shape 92c in the thin sheet 92.

FIG. 24(a) shows a structure mounted with a hole 103a in the spacer 103 in the same manner as that employed in the non-promoting-fluid dispersion type structured packing 111.

FIG. 24(b) shows a structure provided with saw-toothed corrugations 103b in the spacer 103.

FIG. 24(c) shows a structure provided with grooveshape corrugations 103c in the spacer 103.

Further, the thin sheet and the space may have all of or any combinations of saw-tooth, and groove-shaped corrugations, and holes.

The specific surface area of the non-promoting-fluid dispersion type structured packing is more than 350 $m^2/m^3$ and preferably more than 500 $m^2/m^3$. When the specific surface area is less than 350 $m^2/m^3$, a vapor-liquid contact efficiency, the distillation efficiency and the product purity will be lowered. Further, the thickness of said thin sheet and tube ranges preferably from 0.1 to 2.0 mm, considering a structural strength.

Turning to FIG. 2, since the liquid collector D of the vapor-liquid contactor 4a collects a descending liquid in the column, it includes a plurality of inclined sheet 181 for collecting a descending liquid.

A vapor-liquid contactor 2a that constitutes a high pressure column 2, and a vapor-liquid contactor 3a that constitutes a low pressure column may be formed in the same structure as said vapor-liquid contactor 4a.

Further, the vapor-liquid contactor 2a, 3a, 4a is not particularly limited to the above constitutions and they may include a liquid distribution and vapor-liquid contact portion $F_1$ formed of a liquid distributor $E_1$ and a structured packing $A_1$.

In addition, the vapor-liquid contactor 2a, 3a, 4a may be provided with a plurality of liquid collection and distribution-vapor-liquid contact part $F_1$ formed of a liquid collector D, a liquid distributor $E_2$ and a structured packing A in the downward of a liquid distribution-vapor-liquid contact portion $F_1$.

Further, each section 6~9 of the vapor-liquid contactor 3a may include one or a plurality of said liquid-collection distribution-vapor-liquid contact part $F_2$. A section 10 which is a section adjacent to the top of the column is not required to provide with said liquid collector D. That is, a section 10 which is most adjacent to the top of the column may include a liquid distribution-vapor-liquid contact portion F formed of a liquid distributor $E_1$ and a structured packing $A_1$. Further, in addition to said structure, the bottom of each column may be provided with the minute distribution part $B_1$, considering a distribution of ascending vapor. A minute distribution part $B_1$, $B_2$ may include a self-promoting-fluid dispersion type structured packing as mentioned above. For example, a minute liquid distribution may be carried out by providing a packing of a pattern shown in FIGS. 8~10 with a layer or a plurality of layers. The detailed structure, characteristic and effects of such packing are disclosed in Japanese Patent Laid-open No. (Sho) 58-11001. Such packing may suitably be used in a liquid distributor and a minute distribution part, but it may also be used in a conventional vapor-liquid contactor.

Next, one embodiment of the method of gas separation in accordance with the present invention is described. This embodiment includes a method by which each component present in the raw air which is a vapor mixture including nitrogen, oxygen and argon is separated from other component by a cryogenic air separation by using a cryogenic air separation unit shown in FIGS. 1 and 2. In the embodiment shown herein, a vapor-liquid contactor 2a, 3a may include a liquid distribution-vapor-liquid contact part $F_1$ and a liquid collection distribution vapor-liquid contact part $F_2$, in the same manner as a vapor-liquid contactor 4a.

Further, a non-promoting-fluid distribution type structured packing $A_1$, $A_2$ may include a non-promoting-fluid dispersion type structured packing 91. A minute distributor $B_1$, $B_2$ may include a self-promoting-fluid dispersion type structured packing 71. A rough distributor $C_1$, $C_2$ may include a liquid distributor 41.

First, a raw air ① is fed into the lower part of a high pressure column 2 through a tube channel 1. The raw air symbol ① is usually pressurized at about 0.6 MPa in which impurities such as water and carbon dioxide is removed through a pretreatment device using an adsorbent such as silica, alumina gel, molecular sieve, etc., cooled to a given temperature via a main heat exchanger and then fed in a high pressure column 2.

The raw air fed in a high pressure column 2 is ascended as an ascending vapor to the inner portion of the high pressure column 2. The vapor-liquid contactor 2a is contacted with a descending liquid described below to conduct a distillation. By doing so, the raw air is separated into a nitrogen gas (low boiling point component) at the peak of the column and an oxygen-enriched liquid air (high boiling point component) at the base of the column. The inner pressure of a high pressure column 2 may range from 0.4 to 2.0 MPa, for example, when said non-promoting-fluid dispersion type structured packing $A_1$, $A_2$ has a specific surface area of 500 $m^2/m^3$. In that case, a superficial F factor may be determined to be more than 1.0 m/s $(kg/m^3)$ and preferably 1.01~1.6 m/s $(kg/m^3)^{2/1}$.

The nitrogen gas separated in the top portion of a high pressure column 2 is discharged from a high pressure column 2 through a tube channel 12a, introduced into a main condenser 12 and then subjected to a cooling and liquefied. Thereafter, a part thereof is returned to a high pressure column 2 through a tube channel 12b, 12c to form a descending liquid (reflux liquid) flowing down in the inner portion of a high pressure column 2, and the remaining other part is discharged outside the column through a tube channel 23.

Hereinafter, the process by which a distillation is conducted by a contact of a descending liquid and a ascending vapor in the inner portion of a high pressure column 2 is described.

First, the descending liquid is stored in a first dispersion/ distribution box 42 of a rough distribution part $C_1$, transferred to a second dispersion box 43 through a distribution hole, stored in said dispersion box 43, and then dropped in the downward of a rough distribution part $C_1$ in the uniformly dispersed state (roughly dispersed state) over the whole cross-section of the column through the distribution hole provided in the bottom portion.

Then, the descending liquid is transferred to a minute distribution part $B_1$, spread on the surface of a thin sheets 72 of the self-promoting-fluid distribution type structured packing, and then dropped in the downward of the self-promoting-fluid distribution type structured packing in the more minutely and uniformly distributed state. In that case, the descending liquid and ascending vapor in the column are contacted to make a mass transfer between vapor and liquid and carry out a distillation.

Next, the descending liquid is transferred to the non-promoting-fluid dispersion type structured packing $A_1$ (packing 91) and then flowed down on the surface of a thin sheet 92. In that case, the descending liquid is flowed down on the surface of the thin sheet 92 along the thin sheet 92. In that process, the descending liquid is contacted with an ascending vapor in the column.

In a vapor-liquid contactor 2a shown herein, a thin sheet 92 of the packing 91 is disposed to conform to the main flow upward (perpendicular direction) as described above; therefore, all the descending liquid in the packing $A_1$ follow to conform to this direction. For this reason, the flow of the descending liquid is not in disorder and the liquid stream becomes uniform and smooth over the whole section of a spacer and thin sheet 92.

Accordingly, it is possible to prevent from narrowing the flow channel of the ascending vapor due to the disorder of the descending liquid, that enables to assure a sufficient flow area of the ascending vapor, to restrain an increase in pressure loss with an increase in flow resistance of the ascending vapor, and to carry out a distillation, not occurring a flooding. Further, the descending liquid that flows the surface of the thin sheet is easily broaden on the whole thin sheet; a broad contact area of the vapor-liquid is performed; and an efficient distillation is carried out.

In contrast, in the vapor-liquid contactor using only a self-promoting-fluid dispersion type structured packing, at least a part of the thin sheet is inclined relative to the main flow direction (perpendicular direction); therefore, it is easy to occur a flooding under a high load, the descending liquid is difficult to flow in the backside (reverse side) of the inclined part, vapor-liquid contact area is not sufficient, and the distillation efficiency is lowered.

The descending liquid via the non-promoting-fluid dispersion type structured packing $A_1$ is collected in a liquid collector D, introduced into a rough distribution part $C_2$, in which an uniform flow is made, then flowed in the downward via the self-promoting-fluid dispersion type structured packing $B_2$ and the non-promoting-fluid dispersion type structured packing $A_2$ to reach the bottom portion of the column.

In the non-promoting-fluid dispersion type structured packing $A_2$, the descending liquid is smoothly and uniformly flowed on the surface of the thin sheet 92; therefore, a distillation is carried out in the high pressure column 2, not occurring a flooding. Further, a high distillation efficiency is maintained.

A part of the liquid nitrogen discharged outside a high pressure column 2 through a tube channel 23 is introduced into a low pressure column 3 as a reflux liquid nitrogen(2) via a valve 24 and a tube channel 25 to form a descending liquid descending in the low pressure column 3. The other part is discharged outside the system as a product liquid nitrogen (LN$_2$(3)) via a tube channel 22.

The oxygen-enriched liquid-vapor separated in the bottom portion of a high pressure column 2 is discharged from a high pressure column 2 via a tube channel 15, a part of which is introduced into a crude argon column condenser 13 via a tube channel 16, wherein a vapor or liquid in the condenser 13 is subjected to a heat exchange and a heated part is vaporized and then introduced into the middle portion of a low pressure column 3 (a middle portion between the top and bottom of the column) via a tube channel 31 to make a descending liquid or an ascending vapor in a low pressure column 3.

The other portion of oxygen-enriched liquid air discharged from a high pressure column 2 is introduced into the middle portion of a low pressure column 3 through a tube channel 17, a valve 18 and a tube channel 19 to form a descending liquid or an ascending vapor in a low pressure column 3.

The descending liquid and the ascending vapor introduced into a low pressure column 3 are contacted each other in each section 6~10 of the vapor-liquid contactor 3a, and oxygen gas and liquid oxygen are separated near the bottom portion of the column and separated into a nitrogen gas in the top portion of the column.

Where a non-promoting-fluid dispersion type structured packing $A_1$, $A_2$ in the low pressure column 3 has, for example, a specific surface area of 500 m$^2$/m$^3$, the inner pressure of a low pressure column 3 can range from 0.08 to 2.0 MPa and preferably from 0.08 to 0.4 MPa. In that case, a superficial F factor can be more than 1.8 m/s (kg/m$^3$)$^{1/2}$ and preferably from 1.8 to 2.5 m/s(kg/m$^3$)$^{1/2}$.

In each section 6~10 of the vapor-liquid contactor 3a in the low pressure column 3, a descending liquid is smoothly and uniformly flowed on the thin sheet surface of packing $A_1$, $A_2$; therefore, in the low pressure column 3 a distillation is carried out without occurring a flooding. Further, a high distillation efficiency is maintained.

The nitrogen gas separated in the peak portion of a low pressure column 3 is discharged outside the system as a product nitrogen gas (GN$_2$(4)) through a tube channel 21. Further, the oxygen gas separated in the bottom portion of a low pressure column 3 is discharged outside the system as a product oxygen gas (GO$_2$(5)) through a tube channel 32. In addition, the gas separated in the upper portion of a low pressure column 3 is discharged outside the system as a waste nitrogen gas (WG(6)) through a tube channel 20.

A vapor in a low pressure column 3 wherein a some lower position than a position which said tube channel 31 is connected with a low pressure column 3, is fed in the lower portion of crude argon column 4 through a tube channel 26. The gas fed in a crude argon column 4 is distilled in the vapor-liquid contactor 4a that constitutes a crude argon column 4, and the crude argon gas is separated in the top portion of the column. Such crude argon gas is discharged from the top portion of the crude argon column 4 through a tube channel 33, introduced into a condenser 13, subjected to a heat exchange with an oxygen-enriched cryogenic air introduced in the condenser 13 through said tube channel 16, subjected to a cooling and liquefied, and then returned to the upper portion of crude argon column 4 as a reflux through a tube channel 34, 35.

A part of the cryogenic crude argon discharged from a condenser 13 through a tube channel 34 is discharged outside the system as a liquid crude argon (LAr(7)) through a tube channel 29. The liquid separated in the bottom of crude argon column 5 is returned to a low pressure column 3 through a tube channel 27, 28. Moreover, when a corresponding theoretical plate is established largely, a pump 14 can be provided in the tube channel 27, 28 such that the bottom liquid of the column is returned to a low pressure column 3.

In the vapor-liquid contactor 4a in the crude argon column 4, a descending liquid is flowed smoothly and uniformly on the thin sheet surface of the packing $A_1$, $A_2$; therefore, a distillation is carried, without occurring a flooding in the crude argon column 4. Further, a high distillation efficiency is maintained. Moreover, a crude argon column 4 is set to the substantially same number of theoretical plates as in the prior art reference. Hence, it has recently been adopted that an oxygen in the rough argon is eliminated by providing a deoxidizing column. In this case, the de-oxidizing column is disposed in a structure as shown in FIG. 2 and the above mentioned effects can be achieved.

In said vapor-liquid contactor 2a, 3a, 4a, various types of thin sheets that constitute a non-promoting-fluid dispersion type structured packing $A_1$, $A_2$ is disposed such that its pattern is along a main flow direction (perpendicular direction), So, a sufficient ascending vapor flow channel is assured, and a descending liquid in the surface of a thin sheet (or tube) plate 92 is smoothly and uniformly flowed along the whole section of the thin sheet.

For this reason, it can be prevented from occurring a flooding which resists an increase in the pressure loss due to an increase in a flow resistance of the ascending vapor. A sufficient vapor-liquid contact area is established and an efficient distillation is carried out when compared to a vapor-liquid contactor using the self-promoting-fluid dispersion type structured packing having an inclined portion. Accordingly, a liquid load and vapor load can be established largely, without occurring a flooding.

For example, in a conventional vapor-liquid contactor using a packing (self-promoting-fluid dispersion type structured packing) having a specific surface area of 500 m$^2$/m$^3$, a superficial F factor is established to be less than 1.6 m/s(kg/m$^3$) (when the inner pressure of the column ranges from 0.08 to 0.4 MPa), or less than 1.0 m/s(kg/m$^3$) (when the inner pressure of the column is more than 0.4 MPa). In contrast, in said vapor-liquid contactor 2a, 3a, 4a, each superficial F factor can be established to be more than 1.8 m/s(kg/m$^3$) (when the inner pressure of the column ranges from 0.08 to 0.4 MPa), or more than 1.0 m/s (kg/M$^3$) (when the inner pressure of the column ranges from 0.4 to 2.0 MPa).

In this regard, by using a vapor-liquid contactor 2a, 3a, 4a, the height of the column can be established lowly, and the costs required for the production and construction of the apparatus can be reduced. Further, as the upper limit of the load is high, the production rate of the product can be significantly increased and reduced.

However, in the packing column, the inner pressure of the column generally tends to easily occur a flooding as the inner pressure of the column is increased. It is difficult to apply the packing column to a high pressure column of the cryogenic air separation unit having a multiple distillation column. In contrast, in said vapor-liquid contactor 2a, a load can be established highly even at a high pressure; therefore, it is possible to apply to a high pressure column.

Accordingly, the cryogenic air separation unit wherein said vapor-liquid contactor 2a is applied to a high pressure column 2 has many advantages in view of the power cost and product purity when compared to an apparatus wherein a sieve tray column is applied to a high pressure column.

Further, to further improve a function of a minute distribution part $B_1$, $B_2$, a structure wherein at least one of said promoting-fluid-dispersion type structured packing and a parallel plane sheet group is laminated in the axial direction of the column, can be used as a minute distribution part $B_1$, $B_2$.

Figure 25:
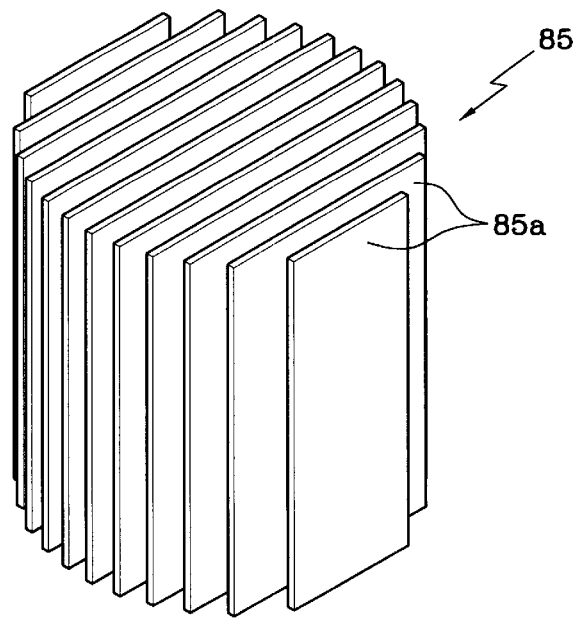
FIG. 25 is a perspective view showing one example of a parallel plane sheet group used in the vapor-liquid contactor in accordance with the present invention.
Figure 26:
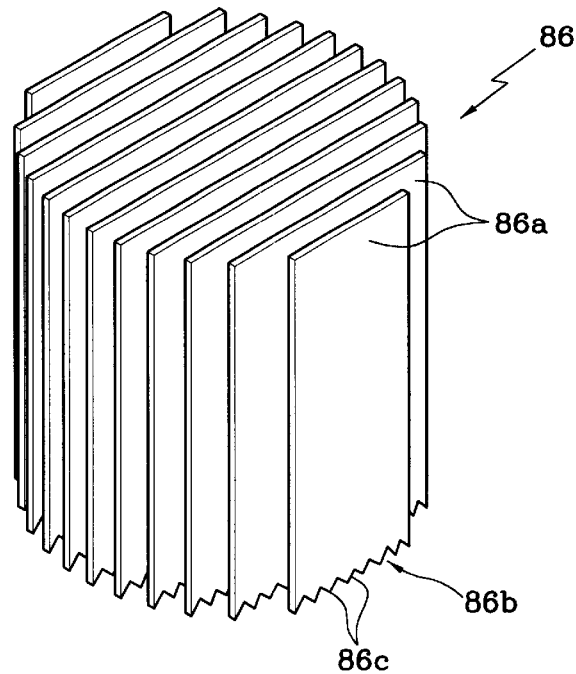
FIG. 26 is a perspective view showing another example of a parallel plane sheet group used in the vapor-liquid contactor in accordance with the present invention.

FIGS. 25 and 26 shows one example of said parallel plane sheet group. The parallel plane sheet group 85 shown in FIG. 25 is formed of a plurality of plane sheets 85a which are arranged in interval in parallel each other. This plane sheet 85a is disposed along the axial direction of the column. Each plane sheet 85a is formed such that the edges perpendicular to the column axis is extended up to the adjacent inner wall of the column. Each plane sheet 85a is fixed each other in a state narrowly inserted between the spacers (not shown) having a thickness equivalent to these spaces.

The thickness of the plane sheet 85a ranges preferably from 0.5 to 5 mm, considering a structural strength. Also, the space of each plane sheet 85a ranges preferably from 3 to 10 mm, considering a liquid dispersion density. The plane sheet 85a is preferably made of a metal, but it may be made of plastics. The pattern and material of spacer are not particularly limited, but its size, for example, horizontal length or column axial length, is preferably small within the range retaining a structural strength such that a flow of plane sheet-like liquid membrane may not be prevented largely.

When said plane sheet group is provided, as a minute distribution part $B_1$, $B_2$, provided in the downward of a self-promoting-fluid-dispersion type structured packing, a liquid minutely distributed in the self-promoting-fluid-distribution type structured packing is fed in a plane sheet group mounted downwardly to form a liquid membrane having an uniform thickness on the surface of each plane sheet and drop downwardly; therefore, the flow rate of liquid becomes uniform over the direction parallel to each plane sheet and the vertical direction to the column axis. By doing so, a further minutely distributed liquid is fed in the non-promoting-fluid-dispersion type structured packing $A_1$, $A_2$.

Further, to increase more clearly a liquid dispersion density of the non-promoting-fluid-dispersion type structured packing $A_1$, $A_2$, in a lower edge portion of each plane sheet that constitutes a plane sheet group, a plurality of projecting part can be formed over the width direction of the plane sheet. Moreover, the width direction denotes a direction parallel to a plane sheet and vertical to a column axis.

FIG. 26 shows a plane sheet group 86 that forms this projecting part. In the lower edge portion 86b of a plane sheet 86a that constitutes a plane sheet group 86 shown herein, a plurality of V-shape projecting part is formed over the whole width direction. A pitch of this projecting part 86c ranges preferably from 3 to 10 mm.

As shown in FIG. 26, when a plurality of projecting parts 86 are, as a plane sheet that constitutes a plane sheet group, formed in the down edge portion 86b, a liquid flowing down near the projecting part 86c is collected near the edge of said projecting part 86c and then dropped down from the edge thereof.

In this regard, a liquid flowing down a surface of plane sheet 86a is transferred to the lower edge portion and thereafter is prevented from flowing along the lower edge portion 86b and is prevented that the flow of liquid is inclined toward the width direction of plane sheet. Accordingly, the more minute liquid distribution can be achieved.

Usually, the non-promoting-fluid-dispersion type structured packing does not have a function to distribute the vapor stream positively. Hence, to increase a distillation performance at the maximum, at least one vapor distributor that do a distribution of ascending vapor in the apparatus, is provided in the downward of the non-promoting-fluid-dispersion type structured packing, considering a distillation of vapor stream.

As this vapor distributor, the self-promoting-fluid-dispersion type structured packing, for example, as shown in FIGS. 6 and 7 is preferred. When the self-promoting-fluid-dispersion type structured packing is used as a vapor distributor, a mist (fine droplet) is occurred at the bottom of said packing and the mist is collided on the thin sheet surface of said packing and trapped in the liquid stream. Hence, the effect to prevent an entrainment is achieved.

Further, in the vapor-liquid contactor according to the present invention, since the non-promoting-fluid-dispersion type structured packing is used under a high load together with vapor and liquid, the specific surface area of the self-promoting-fluid-dispersion type structured packing used in a minute distribution part, etc. preferably is equivalent to or smaller than that of the non-promoting-fluid-dispersion type structured packing in order to prevent flooding.

Hereinafter, the effects of the present invention is clear referring to the examples.

EXAMPLE 1

The computer simulation of a distillation operation using a cryogenic air separation unit shown in FIG. 1 was carried out. The vapor-liquid contactor 2a, 4a in a high pressure column 2 and a crude argon column 4 was assumed to have a liquid distributor $E_1$, a non-promoting-fluid dispersion type structured packing $A_1$, a liquid collector D, a liquid distributor $E_2$ and a non-promoting-fluid dispersion type structured packing $A_2$ along the bottom from the peak of the column, as shown in FIG. 2.

Further, in each section 6~9 of the vapor-liquid contactor 3a, the liquid collector and vapor-liquid contactor $F_2$ was used, and in the section 10, the liquid collector and vapor-liquid contactor $F_1$ was used.

As the non-promoting-fluid dispersion type structured packing $A_1$, $A_2$, a structured packing 91 was used. As the self-promoting-fluid dispersion type structured packing $B_1$, $B_2$, a structured packing 71 was used. As the rough distribution part $C_1$, $C_2$, a liquid distributor 41 was used.

The non-promoting-fluid distribution type structured packing $A_1$, $A_2$ used in a vapor-liquid contactor 4a in a crude argon column 4 was set to have a specific surface area of 500 $m^2/m^3$. The inner pressure of the column was set to about 0.1 MPa and the oxygen concentration in the feed argon was set to about 90%. As a result of simulation, a relation between the resultant packing height and the oxygen concentration in the vapor phase is shown with a solid line in FIG. 25. Further, in FIG the column height 0 m denotes the bottom portion of the column.

Comparative Example 1

In the vapor-liquid contactor 4a, a distillation operation was carried out in the same manner as Example 1, using the same apparatus as shown in FIG. 1 except that the self-promoting-fluid dispersion type structured packing of the same area was used instead of the non-promoting-fluid dispersion type structured packing $A_1$, $A_2$. The results are shown with a dotted line in FIG. 27.

Figure 27:
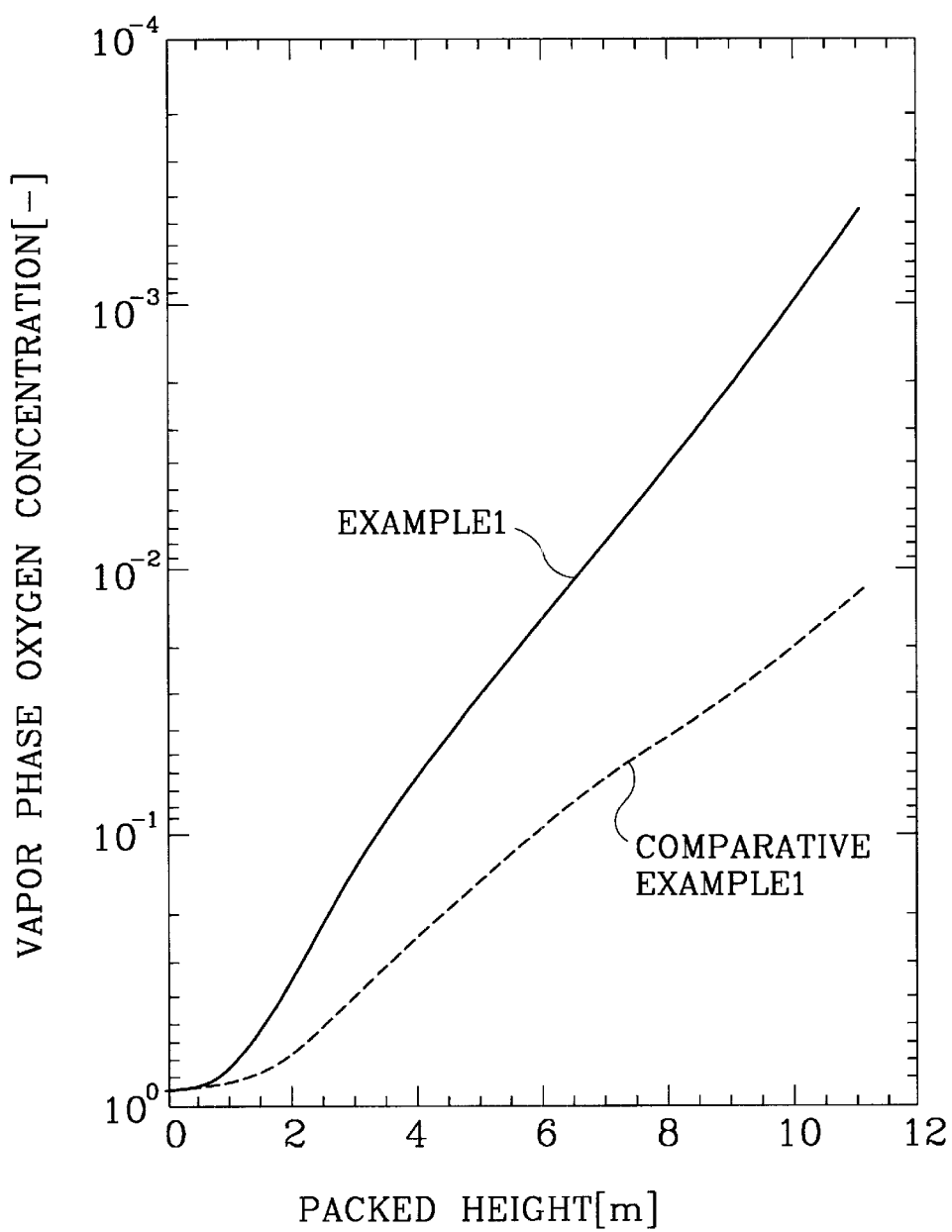
FIG. 27 shows one example of a vapor-liquid contactor as shown in FIG. 2 and the simulation result of distillation operation.

In a vapor-liquid contactor 4a shown in FIG. 27, by using the non-promoting-fluid dispersion type structured packing $A_1$, $A_2$, the required packing height accounts for 60 percent when compared to the case when the self-promoting-fluid dispersion type structured packing is used.

Next, to compare a pressure loss when the non-promoting-fluid-dispersion type structured packing is used as a packing and when the self-promoting-fluid-dispersion type structured packing is used, the following experiments were carried out.

EXAMPLE 2

Figure 28:
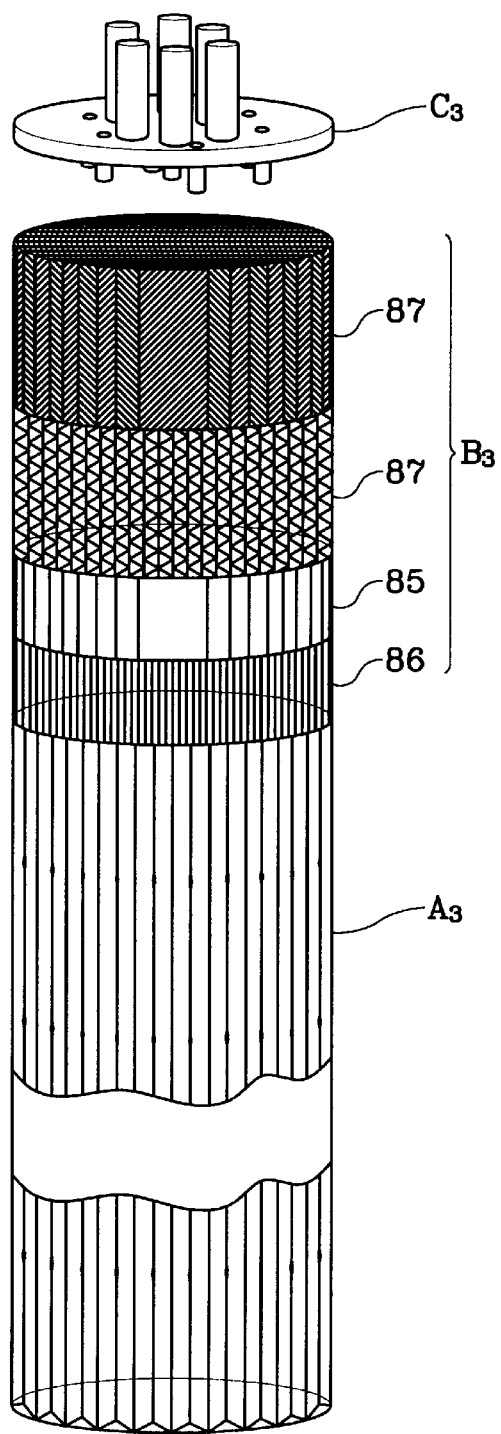
FIG. 28 shows an inner structure of one example of the a vapor-liquid contactor in accordance with the present invention.

The following experiments were carried out by using a distillation column which is a vapor-liquid contactor shown in FIG. 28. This distillation column (inner diameter 208 mm, prepared from transparent vinyl chloride) includes a rough dispersion part $C_3$, a minute distribution part $B_3$, and a non-promoting-fluid-distribution type structured packing $A_3$ over the bottom portion from the top portion of the column.

As the rough distribution part $C_3$, the same part as shown in FIG. 4 was used. As the minute distribution part $B_3$, the self-promoting-fluid dispersion type structured packing 2 elements denoted by the reference number 87 having a specific surface area of 500 $m^2/m^3$ and a height of 100 mm, the parallel plane plate group 85 (height 50 mm) as shown in FIG. 26, and a parallel plane sheet group 86 (height 50 mm) as shown in FIG. 27 were used in the order from the top portion.

In this case, two parallel plane sheet groups 85a, 86a of two parallel plane sheet groups 85, 86 were disposed such that a parallel plane sheet that constitutes each group may have an intersecting relation in the vertical direction.

As the non-promoting-fluid-dispersion type structured packing $A_3$, the packing having a specific surface area of 375 m/m and a height of 600 mm as shown in FIG. 15 was used. The total height of the minute distribution part $B_3$ and the non-promoting-fluid dispersion type structured packing $A_3$ is 900 mm.

The total pressure loss of a rough distribution part $C_3$, a minute distribution part $B_3$ and a non-promoting-fluid dispersion type structured packing $A_3$ was determined by using as a fluid a freon having the same viscosity as air and changing a superficial F factor under the whole reflux condition and pressure 130 kPa.

Comparative Example 2

For comparison, an experiment was carried out by using a distillation column mounted with a self-promoting-fluid dispersion type structured packing 5 elements of 500 $m^2/m^3$, height 207 mm (whole packed height 1035 mm), in the downward of the distillation column using as a packing a self-promoting-fluid dispersion type structured packing, i.e., rough distribution part $C_3$.

As the self-promoting-fluid dispersion type structured packing, the same packing as used in a minute distribution part $B_3$ shown in FIG. 28 was used. In the same manner as in Example 2, a pressure loss under each condition was determined by using as a fluid a freon having the same viscosity as air and changing a superficial F factor under the whole reflux condition.

Figure 29:
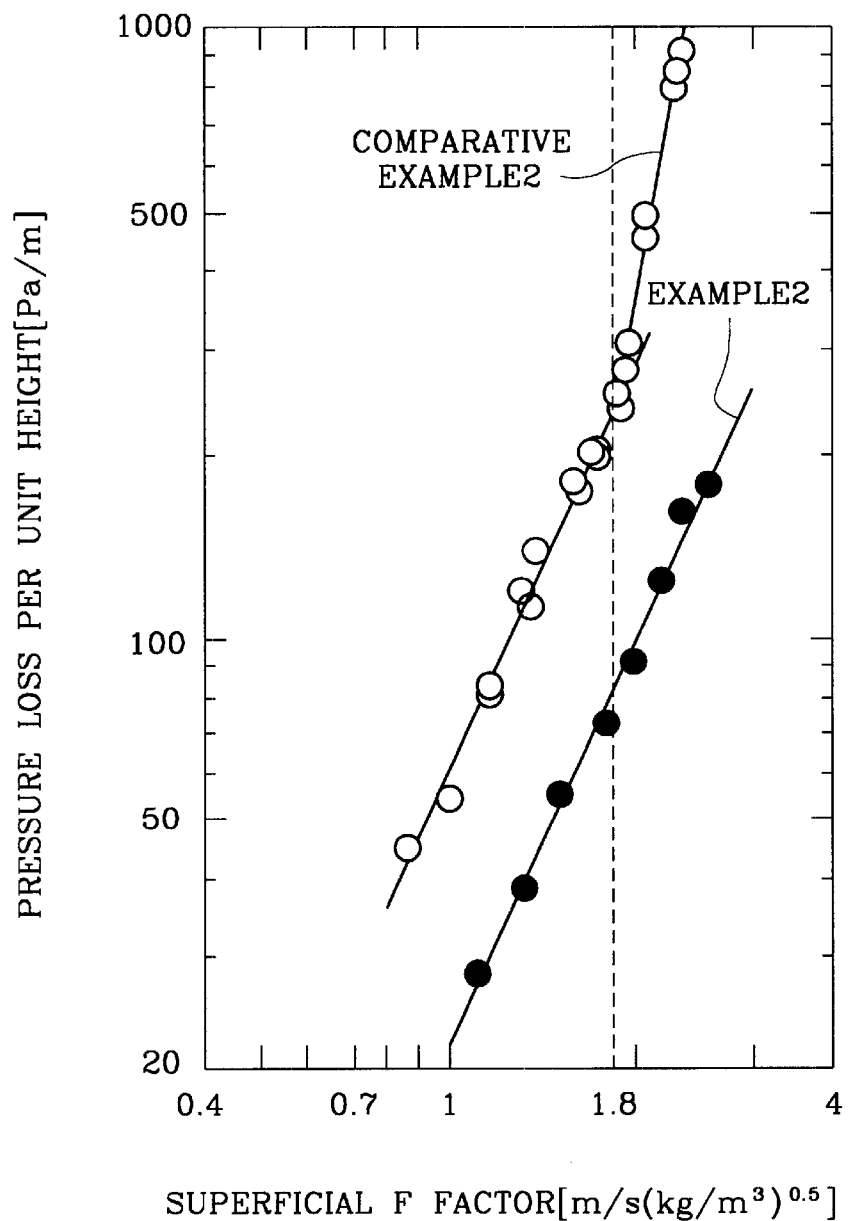
FIG. 29 is a graph showing the experimental result where a horizontal axis is a superficial F factor and a vertical axis is a pressure loss per unit height.

FIG. 29 is a graph showing a pressure loss over the unit height relative to a superficial F factor. As shown in FIG. 29, when the non-promoting-fluid dispersion type structured packing was used as a packing (Example 2) exhibited a clearly lower pressure loss than when the self-promoting-fluid dispersion type structured packing was used (Comparative Example 2).

From the above experimental result, it can be seen that the distillation column used in Example 2 can be designed in smaller column diameter and reduce the cost required for the production and construction of apparatus, when compared to the distillation column used in comparative example 2.

Next, a comparison of liquid distribution when a minute distribution part is mounted in the distillation column and when a minute distribution part is not mounted in the distillation column was carried out.

EXAMPLE 3

As an example that a minute distribution part is mounted in the distillation column, the degree of dispersion of liquid under each condition was observed by using a distillation column of Example 2 shown in FIG. 28 and using as a fluid a freon having the same viscosity as air. Further, a liquid flow in the column and a pattern in liquid distribution was taken by a video.

Comparative Example 3

As an example that a minute distribution part is not mounted in the distillation column, experiment was carried out in the same manner as Example 3 and by using the same distillation column as in Example 3 except that a minute distribution part is not mounted.

Figure 30:
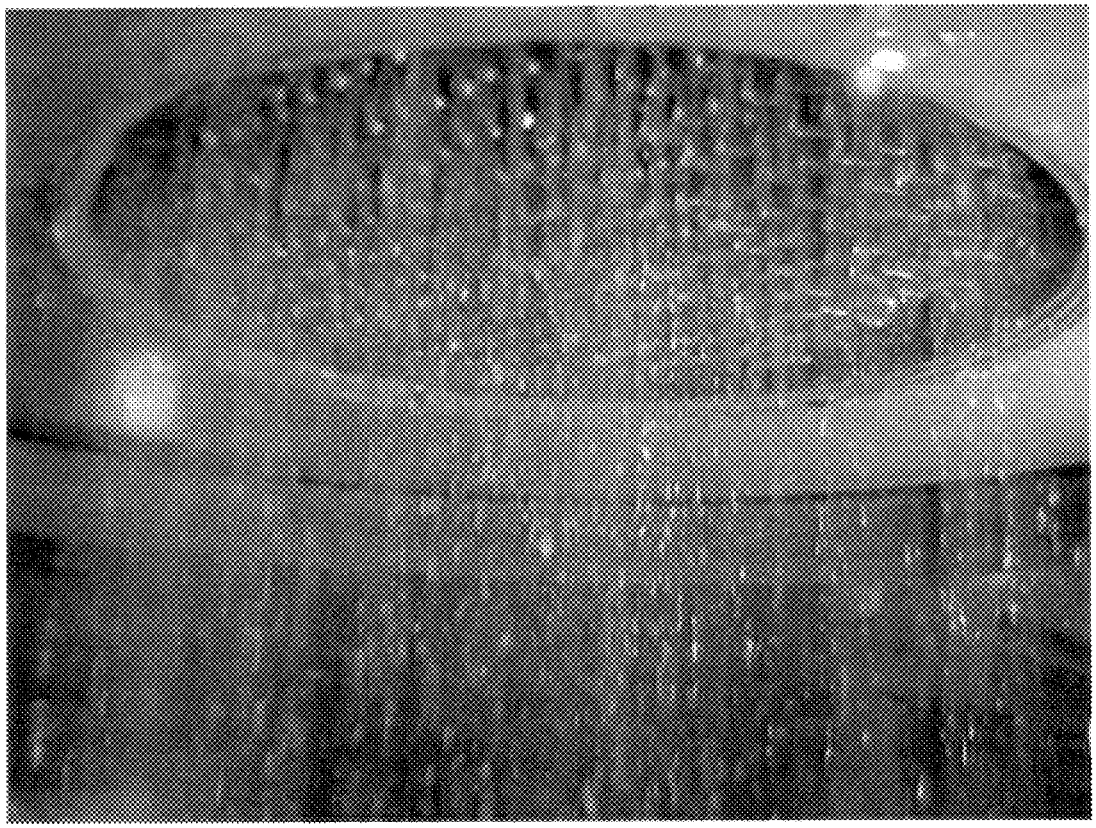
FIG. 30 is a photograph showing a fluid dropping down from the lower edge of a packing when one example of a vapor-liquid contactor in accordance with the present invention is used.
Figure 31:
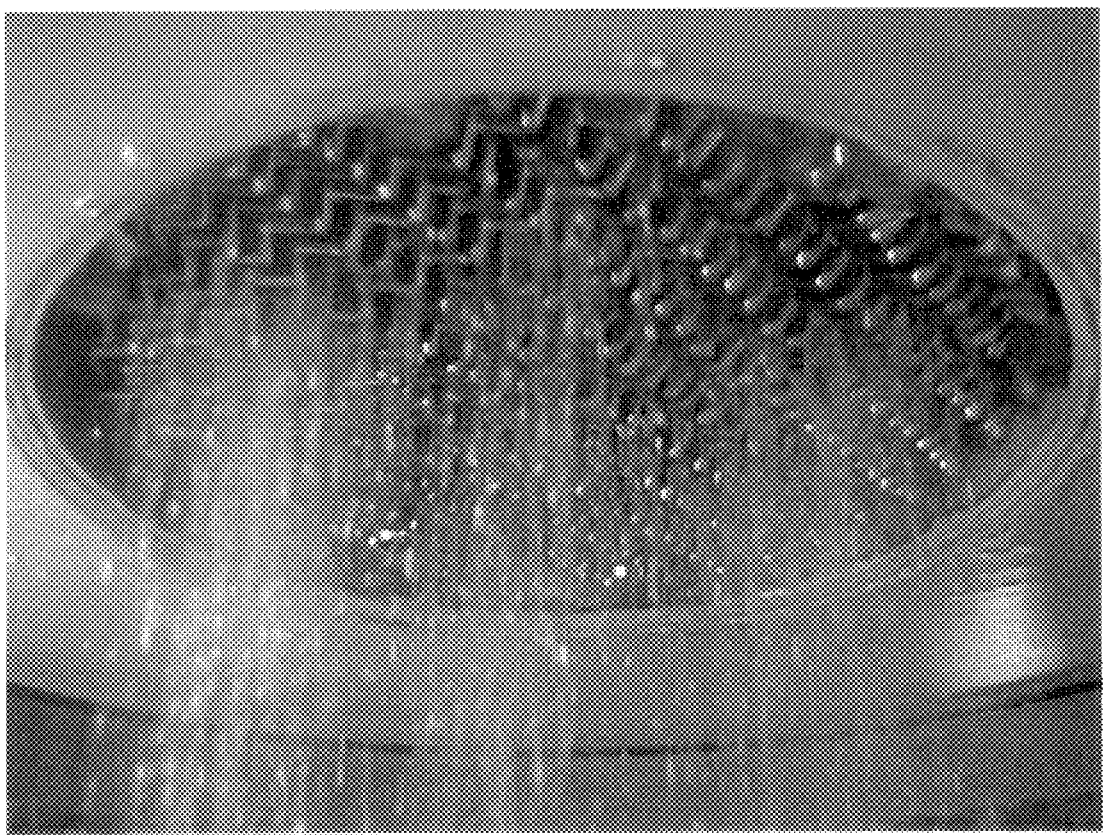
FIG. 31 is a photograph showing a fluid dropping down from the lower edge of a packing when a vapor-liquid contactor in accordance with the comparative example is used.

FIGS. 30 and 31 are a photograph taken from a fluid pattern dropping down from the lower edge of the non-promoting-fluid dispersion type structured packing of the distillation column of Example 3 and Comparative Example 3 under the condition of a pressure 130 kPa, liquid load converted into gas load 2 m/s $(kg/m^3)^{1/2}$.

It can be confirmed from FIG. 30 that when a packing has a minute liquid distribution part (Example 3), a droplet flows and drops down in the linear direction from each stream channel, and that each of these droplets is distributed uniformly over the whole column.

In contrast, it can be seen that when a minute distribution part is not mounted (Comparative Example 3), the droplet is not evenly distributed as shown in FIG. 31.

What is claimed is:

1. A gas separation method which separates a vapor mixture comprising at least two components into the two components using a vapor-liquid contactor in a column; wherein said method comprises:
    a) providing a vapor-liquid contactor including a non-promoting-fluid dispersion structured packing formed of various thin-sheets or tubes which direct the flow of said mixture vertically, said non-promoting-liquid-dispersion structured packing having a specific surface area of 350 $m^2/m^3$ or more; and
    b) contacting said vapor and liquid countercurrently on the surface of said packing under a pressure of from 0.08 to 0.4 MPa, and at a vapor load of 1.8 m/s $(kg/m^3)^{1/2}$ or more in superficial F factor.

2. A gas separation method which separates a vapor mixture comprising at least two components into the two components using a vapor-liquid contactor in a column; wherein said method comprises:
    a) providing a vapor-liquid contactor including a non-promoting-fluid dispersion structured packing formed of various thin-sheets or tubes which direct the Pow of said mixture vertically, said non-promoting-liquid-dispersion structured packing having. specific surface area of 350 $m^2 m^3$ or more, and
    b) contacting said vapor and liquid countercurrently on the surface of said packing under a pressure of from 0.4 to 2.0 MPa, and at a vapor load of 1.0 m/s $(kg/m^3)^{1/2}$ or more in superficial F factor.

* * * * *